(12) United States Patent
Sika

(10) Patent No.: US 11,436,536 B2
(45) Date of Patent: Sep. 6, 2022

(54) SYSTEMS AND METHODS FOR DATA COLLECTION AND ANALYSIS AT THE EDGE

(71) Applicant: Lucid Circuit, Inc., Santa Monica, CA (US)

(72) Inventor: Michel D Sika, Santa Monica, CA (US)

(*) Notice: Subject to any disclaimer, the term of this patent is extended or adjusted under 35 U.S.C. 154(b) by 0 days.

(21) Appl. No.: 16/985,199

(22) Filed: Aug. 4, 2020

(65) Prior Publication Data

US 2020/0364622 A1    Nov. 19, 2020

Related U.S. Application Data

(63) Continuation of application No. 16/275,305, filed on Feb. 13, 2019, now Pat. No. 10,755,201.

(60) Provisional application No. 62/630,802, filed on Feb. 14, 2018, provisional application No. 62/683,497, filed on Jun. 11, 2018.

(51) Int. Cl.
| | | |
|---|---|---|
| G06N 20/00 | (2019.01) | |
| H04L 9/30 | (2006.01) | |
| H04L 9/06 | (2006.01) | |
| H04L 9/32 | (2006.01) | |
| H04L 9/08 | (2006.01) | |

(52) U.S. Cl.
CPC .......... *G06N 20/00* (2019.01); *H04L 9/0643* (2013.01); *H04L 9/0866* (2013.01); *H04L 9/30* (2013.01); *H04L 9/3247* (2013.01)

(58) Field of Classification Search
CPC ...... G06N 20/00; G06N 20/10; H04L 9/0643; H04L 9/0866; H04L 9/3247; H04L 9/30; H01L 25/18; H01L 25/50; H01L 27/0207; H01L 23/481; H01L 23/5381; H01L 23/5386; H01L 24/17; H01L 24/81; H03K 19/017581

See application file for complete search history.

(56) References Cited

U.S. PATENT DOCUMENTS

| | | | | |
|---|---|---|---|---|
| 10,755,201 B2 * | 8/2020 | Sika | ................. | H04L 9/3247 |
| 2019/0044515 A1 * | 2/2019 | Gutala | ............ | H03K 19/17796 |

OTHER PUBLICATIONS

Google Search History, Jul. 23, 2021, 1 pp. (Year: 2021).*

* cited by examiner

*Primary Examiner* — Toan M Le
(74) *Attorney, Agent, or Firm* — Andy T. Pho; Shant Tchakerian

(57) ABSTRACT

A microelectronic device for generating analysis results from data received from a sensor.

20 Claims, 15 Drawing Sheets

SYSTEMS AND METHODS FOR DATA COLLECTION AND ANALYSIS AT THE EDGE

CROSS-REFERENCE TO RELATED APPLICATIONS

This application is a continuation of U.S. patent application Ser. No. 16/275,305, filed on 13-Feb.-2019, which claims the benefit of U.S. Provisional Application No. 62/630,802, filed on 14-Feb.-2018, and U.S. Provisional Application No. 62/683,497, filed on 11-Jun.-2018, which are incorporated in their entirety by this reference.

TECHNICAL FIELD

This disclosure relates generally to data collection at edge devices, and more specifically to new and useful systems and methods for analyzing data at an edge device.

BACKGROUND

Machine learning applications typically involve use of purpose-built hardware that analyzes data collected from one or more separate hardware devices. This is typically accomplished in a manner where the data collection process is disjoint from the analysis and learning processes. Moreover, the analysis and learning processes are typically accomplished in systems that are purpose-built complex arrangements of high-cost computing hardware and software infrastructure. While such solutions might be effective at applying learning algorithms to data, important analysis, assessment and control capabilities are sometimes missing. These missing capabilities might prevent current solutions from being well suited for applying learning and analysis techniques to data as it is collected at the edge where this information is created. Due to the disjoint nature of data collection, analysis and learning in conventional systems, the data to which algorithms are applied is "stale" at the time of consumption. As a result conventional systems might have limited applicability to real-time data.

DESCRIPTION OF EMBODIMENTS

Figure 1:
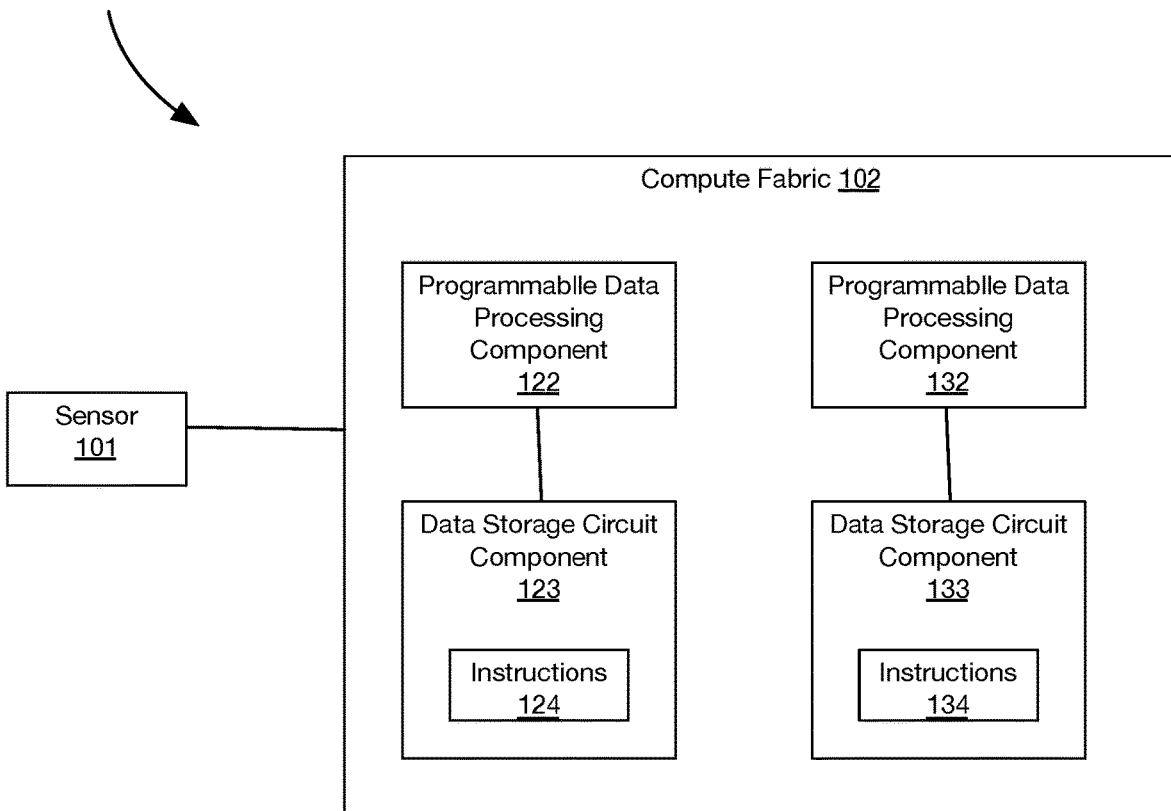
FIG. 1 is a schematic representation of a system, according to embodiments.

The following description of embodiments is not intended to limit the disclosure to these embodiments, but rather to enable any person skilled in the art to make and use the embodiments disclosed herein.

1. Overview

Embodiments described herein provide systems and methods for collection and processing of data at an edge via a microelectronic device that includes a sensor and a compute fabric. In some embodiments, data is collected and processed by using a microelectronics device that includes one or more sensors and one or more compute fabric components (e.g., data processing components, data storage components), wherein the sensors are electrically or communicatively coupled to the compute fabric components.

In some embodiments, the one or more sensors and one or more compute fabric components are included in a same microelectronic device package.

In some embodiments, at least one sensor is integrated into a compute fabric of the microelectronics device, wherein the compute fabric includes the one or more compute fabric components.

In some embodiments, at least one sensor is fabricated in a first semiconductor integrated circuit die, the one or more compute fabric components are fabricated in a second semiconductor integrated circuit die, and at least one sensor of the first integrated circuit die is directly coupled to at least one compute fabric component of the second semiconductor integrated circuit die via an interface medium.

In some embodiments, at least one sensor is fabricated in a first semiconductor integrated circuit die, the one or more compute fabric components are fabricated in a second semiconductor integrated circuit die, at least one sensor of the first integrated circuit die is directly coupled to at least one compute fabric component of the second semiconductor integrated circuit die via an interface medium, and a sensor external to the microelectronic device is communicatively coupled (or electrically coupled) to a sensor of the first semiconductor integrated circuit die.

In some embodiments, a sensor external to the compute fabric is communicatively coupled (or electrically coupled) to the compute fabric via a bridge interface medium that is external to the microelectronic device, and the bridge medium is communicatively (or electrically) coupled to the compute fabric.

In some embodiments, a sensor external to the compute fabric is electrically coupled to the compute fabric via an electric interconnect.

In some embodiments, a sensor external to the compute fabric is electrically coupled to the compute fabric via another sensor that is coupled to the compute fabric.

In some embodiments, the compute fabric receives sensor data from a device that is external to the compute fabric and that is electrically coupled to the compute fabric compute fabric via an electric interconnect.

In some embodiments, the compute fabric receives sensor data from a device that is external to the compute fabric and that is electrically coupled to the compute fabric via another sensor that is coupled to the compute fabric.

In some embodiments, the compute fabric includes at least one sensor that is constructed to receive sensor data transmitted by an external transmitter that is communicatively coupled to a sensor that is external to the compute fabric, wherein the sensor that is external to the compute fabric generates the sensor data transmitted by the external transmitter.

In some embodiments, the compute fabric is constructed to selectively enable collection of data from one or more sensor components of the microelectronic device.

In some embodiments, the compute fabric of the microelectronic device is constructed to combine data captured by two or more sensor components of the microelectronic device.

In some embodiments, the compute fabric of the microelectronic device is constructed to preprocess data collected by one or more sensor components of the microelectronics device by transforming the data into a format for machine learning processing by the compute fabric.

In some embodiments, the compute fabric of the microelectronic device is constructed to perform a machine learning process.

In some embodiments, the compute fabric of the microelectronic device is constructed to perform a statistical classification process. In some embodiments, the compute fabric of the microelectronic device is constructed to perform a statistical spectral density estimation. In some embodiments, the compute fabric of the microelectronic device is constructed to perform a clustering process. In some embodiments, the compute fabric of the microelectronic device is constructed to perform a principal component analysis process. In some embodiments, the compute fabric of the microelectronic device is constructed to perform an independent component analysis process. In some embodiments, the compute fabric of the microelectronic device is constructed to perform a singular value decomposition process. In some embodiments, the compute fabric of the microelectronic device is constructed to perform a learning classifier process. In some embodiments, the compute fabric of the microelectronic device is constructed to perform a kernel estimator process.

In some embodiments, the compute fabric of the microelectronics device is constructed to collect identifying information unique to intrinsic physical specificities of at least one component of the microelectronics device. In some embodiments, the identifying information is a Physically Unclonable Function (PUF). In some embodiments, the identifying information is used to generate a Physically Unclonable Function (PUF).

In some embodiments, the intrinsic physical specificities of at least one component are related to the manufacturing of the microelectronics device, and are unique with respect to another similarly manufactured microelectronics device. In some embodiments, the collected identifying information relates to intrinsic specificities of a selected processing component of the compute fabric. In some embodiments, the collected identifying information relates to intrinsic specificities of a selected storage component of the compute fabric. In some embodiments, the collected identifying information relates to intrinsic specificities of a selected sensor component of the microelectronics device. In some embodiments, a processing component of the compute fabric collects the identifying information. In some embodiments, a selected processing component of the compute fabric collects the identifying information. In some embodiments, the compute fabric collects the identifying information by selecting at least one component (e.g., processing component, storage component, sensor) of the microelectronics device, changing biasing and control parameters of each selected component of the microelectronics device, and generating the identifying information based on results of the changing of the biasing and control parameters.

In some embodiments, the microelectronics device uses the identifying information to calibrate individual sensor components. In some embodiments, the microelectronics device uses the identifying information to calibrate groups of sensor components.

In some embodiments, the microelectronics device uses the identifying information to generate a secret cryptographic key. In some embodiments, the microelectronics device uses the identifying information to generate a cryptographic private/public key pair. In some embodiments, the microelectronics device uses the identifying information to generate authentication information. In some embodiments, the microelectronics device uses the identifying information to generate authorization information. In some embodiments, the microelectronics device uses the identifying information to generate a digital signature. In some embodiments, the microelectronics device uses the identifying information to generate data tagging information for data collected by the microelectronics device. In some embodiments, the microelectronics device uses the identifying information to encrypt data. In some embodiments, the microelectronics device uses the identifying information to decrypt data.

In some embodiments, the compute fabric of the microelectronic device is constructed to perform a machine learning process, and the microelectronics device uses the identifying information to encrypt data generated by the machine learning process.

In some embodiments, the compute fabric of the microelectronic device is constructed to perform a machine learning process, and the microelectronics device uses the identifying information to digitally sign data generated by the machine learning process.

2. Systems

FIG. 1

FIG. 1 is a schematic representation of a system 100, according to some embodiments. In some embodiments, the system 100 includes at least one sensor 101 and a runtime-adaptable compute fabric 102. In some embodiments, the system 100 includes a runtime-adaptable compute fabric 102 that includes at least one sensor (e.g., a sensor similar to sensor 101). In some embodiments, the runtime-adaptable compute fabric 102 is included in a microelectronic device. In some embodiments, the sensor 101 is included in a microelectronic device. In some embodiments, the runtime-adaptable compute fabric 102 and the sensor 101 are included in different microelectronic devices. In some embodiments, the runtime-adaptable compute fabric 102 and the sensor 101 are included a same microelectronic device.

In some embodiments, the runtime-adaptable compute fabric 102 includes a plurality of compute fabric components, including at least one programmable data processing circuit component (e.g., 122) and at least one data storage circuit component (e.g., 123). In some embodiments, the runtime-adaptable compute fabric 102 includes a plurality of compute fabric components, including at least one programmable data processing circuit component (e.g., 122), at least one data storage circuit component (e.g., 123) and at least one sensor.

In some embodiments, the compute fabric components of 102 are arranged on a single compute fabric die. In some embodiments, the compute fabric components of 102 are arranged on a plurality of compute fabric dies. In some embodiments, a programmable data processing circuit component 122 is coupled to a data storage circuit component 123, and the data storage circuit component includes instructions 124 that are executed by the data processing circuit component 122. In some embodiments, the programmable data processing circuit component 122 is re-programmed by updating the instructions 124. In some embodiments, a programmable data processing circuit component 132 is coupled to a data storage circuit component 133, and the data storage circuit component includes instructions 134 that are executed by the data processing circuit component 132.

In some embodiments, the programmable data processing circuit component 132 is re-programmed by updating the instructions 134.

In some embodiments, system 100 includes a plurality of sensors. In some embodiments, the plurality of sensors and one or more compute fabric components of the runtime-adaptable compute fabric 102 are included in a same microelectronic device package.

In some embodiments, at least one sensor is integrated into the runtime-adaptable compute fabric 102, wherein the compute fabric includes the one or more compute fabric components.

In some embodiments, a programmable data processing circuit component 122 is coupled to a sensor included in the compute fabric 102. In some embodiments, a data storage circuit component 123 is coupled to a sensor included in the compute fabric 102.

In some embodiments, at least one sensor is fabricated in a first semiconductor integrated circuit die, the one or more compute fabric components are fabricated in a second semiconductor integrated circuit die, and at least one sensor of the first integrated circuit die is directly coupled to at least one compute fabric component of the second semiconductor integrated circuit die via an interface medium.

In some embodiments, at least one sensor is fabricated in a first semiconductor integrated circuit die, the one or more compute fabric components are fabricated in a second semiconductor integrated circuit die, at least one sensor of the first integrated circuit die is directly coupled to at least one compute fabric component of the second semiconductor integrated circuit die via an interface medium, and a sensor external to the microelectronic device is communicatively coupled (or electrically coupled) to a sensor of the first semiconductor integrated circuit die.

In some embodiments, a sensor is communicatively coupled (or electrically coupled) to at least one compute fabric component via a bridge interface medium that is external to the one or more compute fabric component, and the bridge medium is communicatively (or electrically) coupled to the one or more compute fabric component.

In some embodiments, a sensor is electrically coupled to the compute fabric via an electric interconnect.

In some embodiments, a sensor is electrically coupled to the compute fabric via another sensor that is coupled to the compute fabric.

In some embodiments, the compute fabric receives sensor data from a device that is external to the compute fabric and that is electrically coupled to the compute fabric via an electric interconnect.

In some embodiments, the compute fabric receives sensor data from a device that is external to the compute fabric and that is electrically coupled to the compute fabric via another sensor that is coupled to the compute fabric.

In some embodiments, the compute fabric is coupled to a first sensor that is constructed to receive sensor data transmitted by an external transmitter that is communicatively coupled to a second sensor that is external to the compute fabric, wherein the second sensor that is external to the compute fabric generates the sensor data transmitted by the external transmitter.

In some embodiments, a first programmable data processing circuit component (e.g., 122) is coupled to a first data storage circuit component (e.g., 123) and at least a second data storage circuit component (e.g., 133).

In some embodiments, a first programmable data processing circuit component (e.g., 122) is coupled to a first data storage circuit component (e.g., 123) and at least a second programmable data processing circuit component (e.g., 132).

In some embodiments, a first programmable data processing circuit component (e.g., 122) is coupled to at least a second programmable data processing circuit component (e.g., 132).

In some embodiments, a first programmable data processing circuit component (e.g., 122) is coupled to a first data storage circuit component (e.g., 123), and at least a second programmable data processing circuit component (e.g., 132) is also coupled to the first data storage circuit component (e.g., 123).

In some embodiments, the system 100 includes a sensor constructed to measure voltage and a circuit constructed to measure current.

In some embodiments, the system 100 includes a sensor constructed to measure electromagnetic waves.

In some embodiments, the system 100 includes a sensor constructed to measure magnetic waves.

In some embodiments, the system 100 includes a sensor constructed to measure temperature.

FIG. 2

Figure 2:
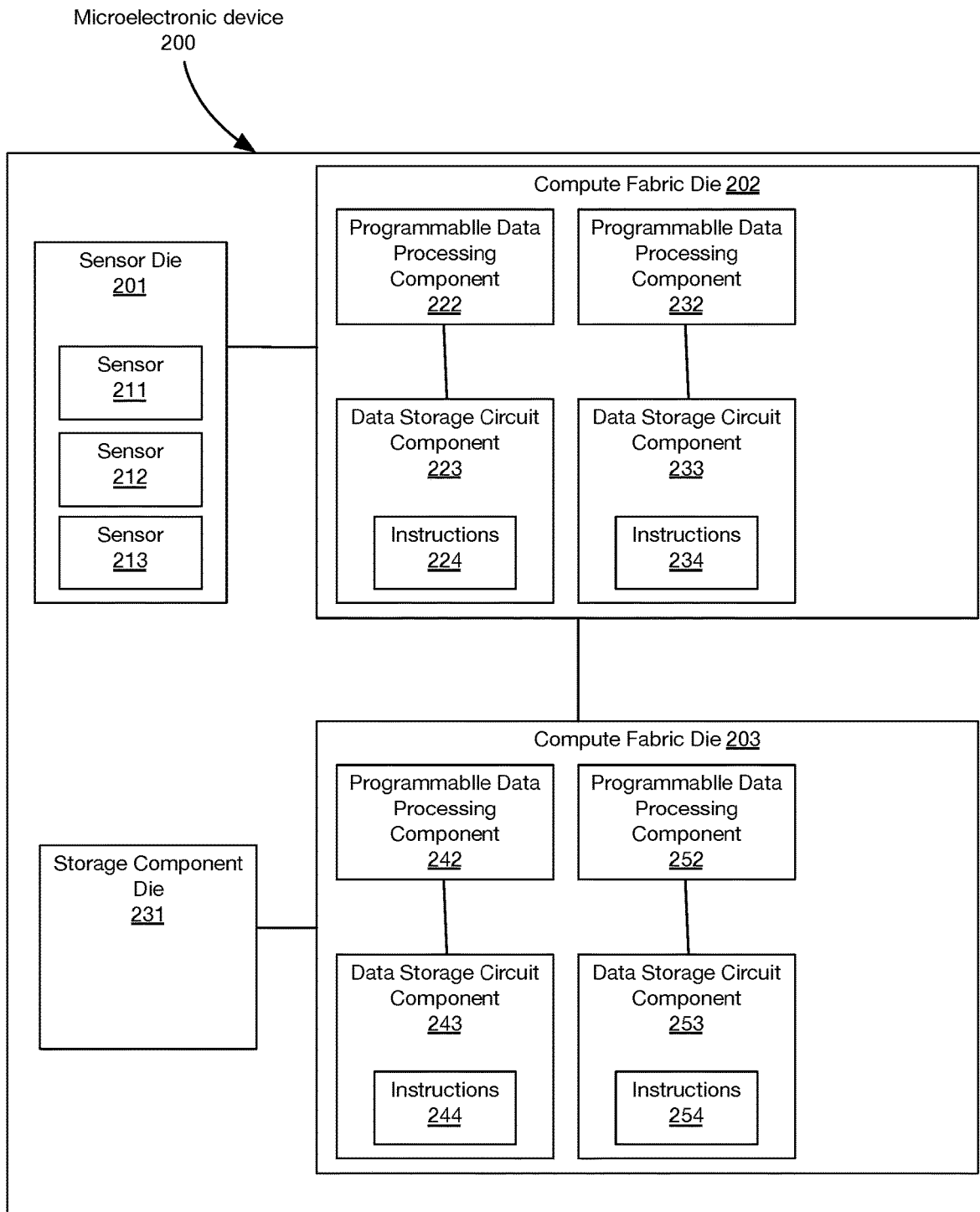
FIG. 2 is a schematic representation of a system, according to embodiments.

FIG. 2 is a schematic representation of a system 200 that is implemented as a microelectronic device that includes at least a first sensor die 201 and a first runtime-adaptable compute fabric die 202. In some embodiments, the first sensor die 201 and the compute fabric die 202 are integrated circuit semiconductor dies.

In some embodiments, the sensor die 201 includes a plurality of sensors (e.g., 211, 212, 213) including a first sensor 211. In some embodiments, the microelectronic device includes a plurality of sensor dies, each sensor die including at least one sensor.

In some embodiments, the first runtime-adaptable compute fabric die 202 includes a first programmable data processing circuit component 222 and a first data storage circuit component 223, wherein the first programmable data processing circuit component is electrically coupled to the first data storage circuit component.

In some embodiments, the first runtime-adaptable compute fabric die 202 includes a plurality of programmable data processing circuit components (e.g., 222, 232) and data storage circuit components (e.g., 223, 233), wherein within the first compute fabric die 202 at least one of the programmable data processing circuit components (e.g., 222) is electrically coupled to at least one of the plurality of data storage circuit components (e.g., 223).

In some embodiments, the microelectronic device includes a plurality of runtime-adaptable compute fabric dies including the first runtime-adaptable compute fabric die 202 and a second runtime-adaptable compute fabric die 203. In some embodiments, each compute fabric die includes a first programmable data processing circuit component (e.g., 222, 242) and a first data storage circuit component (e.g., 223, 243), wherein the first programmable data processing circuit component is electrically coupled to the first data storage circuit component. In some embodiments, each compute fabric die (e.g., 202) includes a plurality of programmable data processing circuit components (e.g., 222, 232, 242, 252) and data storage circuit components (e.g., 223, 233, 243, 253), wherein within each compute fabric die (e.g., 202, 203) at least one of the programmable data processing circuit components is electrically coupled to at least one of the plurality of data storage circuit components.

In some embodiments, each data storage component includes instructions (e.g., 224, 234, 244, 254) that are executed by a data processing circuit component coupled to the data storage component.

In some embodiments, the microelectronic device includes at least one storage component die 231, wherein each storage component die is electrically coupled to at least one of the plurality of compute fabric dies (e.g., 202, 203). In some embodiments, the microelectronic device includes at least one storage component die 231, wherein each storage component die is electrically coupled to at least one of the plurality of compute fabric dies (e.g., 202, 203) via one of an integrated interface medium (as described herein), a bridge device (as described herein), an electrical interconnect, and a transmitter (as described herein).

In some embodiments, each sensor die (e.g., 201), compute fabric die (e.g., 202, 203), and storage component die (e.g., 231) is an integrated circuit semiconductor die.

In some embodiments, the microelectronic device includes at least a first compute fabric die (e.g., 202) and a second compute fabric die (e.g., 203) electrically coupled to the first compute fabric die (e.g., 202) via one of an integrated interface medium (as described herein), a bridge device (as described herein), an electrical interconnect, and a transmitter (as described herein).

In some embodiments, a data processing component of the microelectronic device is electrically coupled to the first sensor 211. In some embodiments, a storage component of the microelectronic device is electrically coupled to the first sensor 211.

In some embodiments, each compute fabric die has a same system architecture. In some embodiments, each processing circuit component has a same instruction set.

In some embodiments, at least one data processing circuit component (e.g., 222) is coupled to a data storage circuit component (e.g., 223) that includes processing circuit instructions (e.g., 224) for selecting at least one of a sensor (e.g., 211), a data storage circuit component (e.g., 222), and a data processing circuit component (e.g., 223) as an intrinsic properties component, and at least one data processing circuit component is coupled to a data storage circuit component that includes processing circuit instructions (e.g., 234) for generating identifying information by changing biasing and control parameters of the selected intrinsic properties component, and generating the identifying information based on the results of the changing of the biasing and control parameters.

In some embodiments at least one storage component die includes a high bandwidth memory (HBM).

In some embodiments, at least one programmable data processing component is constructed to perform linear algebra computation.

In some embodiments, at least one programmable data processing component is constructed to perform arithmetic.

In some embodiments, at least a first compute fabric die is electrically coupled to a second compute fabric die in a die stacking arrangement.

In some embodiments, at least a first compute fabric die is electrically interconnected to a second compute fabric die via at least one TSV, and an interposer die is stacked atop the first compute fabric die and the second compute fabric die.

In some embodiments, at least a first compute fabric die is electrically coupled to a second compute fabric die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, a first compute fabric die is electrically coupled to a first storage component die in a die stacking arrangement.

In some embodiments, at least a first compute fabric die is electrically interconnected to a first storage component die via at least one TSV, and an interposer die is stacked atop the first compute fabric die and the first storage component die.

In some embodiments, at least a first compute fabric die is electrically interconnected to a first storage component die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, at least a first storage component die is electrically coupled to a second storage component die in a die stacking arrangement.

In some embodiments, at least a first storage component die is electrically interconnected to a second storage component die via at least one TSV, and an interposer die is stacked atop the first storage component die and the second storage component die.

In some embodiments, at least a first storage component die is electrically interconnected to a second storage component die via an interface medium. In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die.

In some embodiments, each programmable data processing circuit component is electrically coupled to at least one data storage circuit component that includes machine-executable program instructions that are executable by the programmable data processing circuit component, and wherein each programmable data processing circuit component is programmed by storing program instructions at the storage circuit component electrically coupled to the data processing circuit component.

In some embodiments, the plurality of sensors are included in a first sensor die, the first sensor die is an integrated circuit semiconductor die, and the first sensor die is electrically coupled to at least one of a data processing component and a storage component of the microelectronic device via one of an integrated interface medium and a die stacking arrangement.

In some embodiments, the integrated interface medium includes through-silicon via (TSV) vertical electrical connections.

In some embodiments, the first sensor die (e.g., 201) includes at least one of a circuit constructed to measure voltage and a circuit constructed to measure current.

In some embodiments, the first sensor die (e.g., 201) includes at least one of a circuit constructed to measure electromagnetic waves.

In some embodiments, the first sensor die (e.g., 201) includes at least one of a circuit constructed to measure magnetic waves.

In some embodiments, the first sensor die (e.g., 201) includes at least one of a circuit constructed to measure temperature.

In some embodiments, the microelectronic device includes at least a second sensor that is different from the first sensor.

In some embodiments, each programmable data processing circuit component has a same system architecture.

In some embodiments, a first programmable data processing circuit component (e.g., 222) is coupled to a first data storage circuit component (e.g., 223) and at least a second data storage circuit component (e.g., 233, 243, 253).

In some embodiments, a first programmable data processing circuit component (e.g., 222) is coupled to a first data storage circuit component (e.g., 223) and at least a second programmable data processing circuit component (e.g., 232, 242, 252).

In some embodiments, a first programmable data processing circuit component (e.g., 222) is coupled to at least a second programmable data processing circuit component (e.g., 232, 242, 252).

In some embodiments, a first programmable data processing circuit component (e.g., 222) is coupled to a first data storage circuit component (e.g., 223), and at least a second programmable data processing circuit component (e.g., 232, 242, 252) is also coupled to the first data storage circuit component (e.g., 223).

FIGS. 8-14

Figure 8:
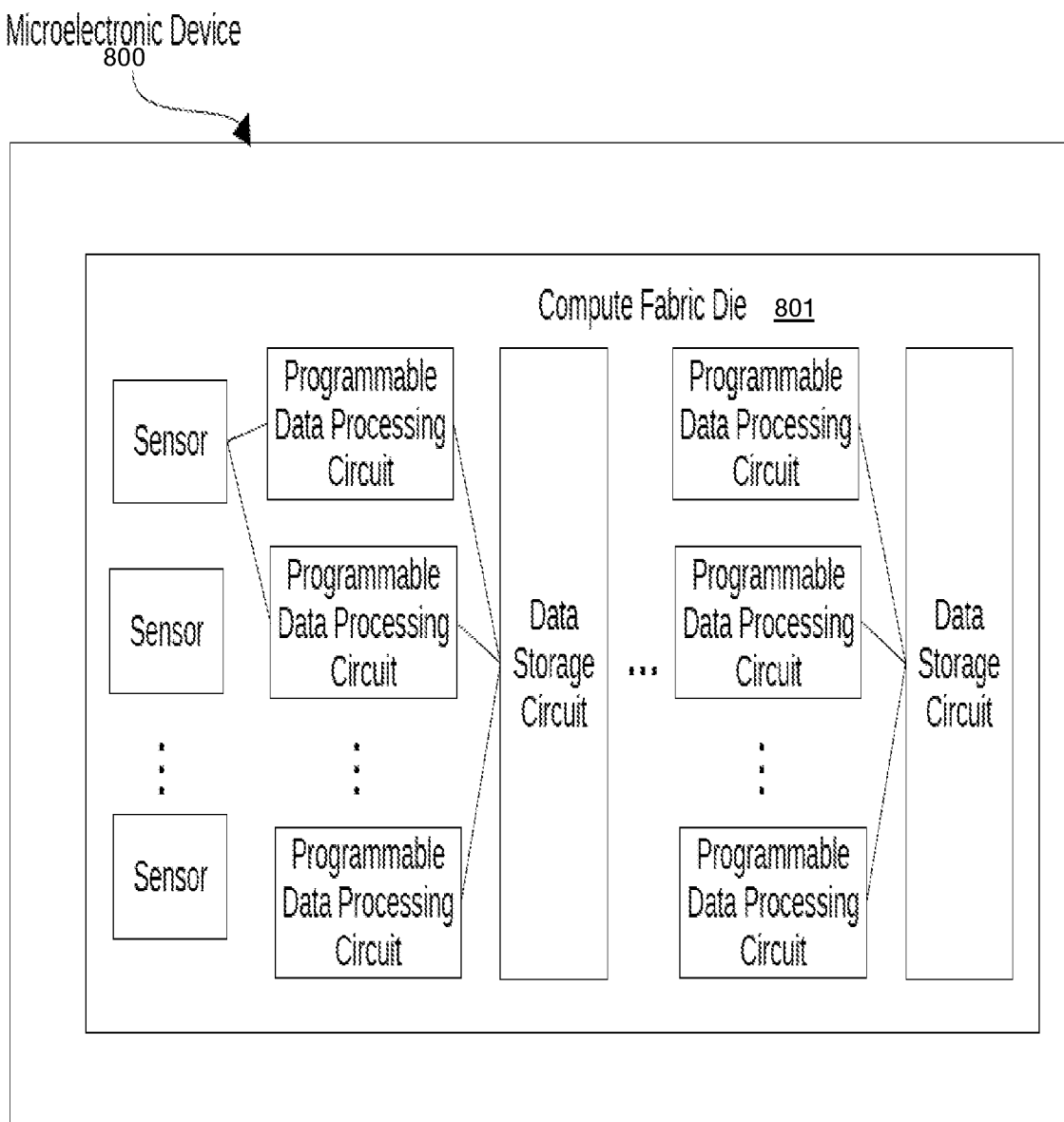

FIG. 8 is a schematic representation of a system 800 that includes a compute fabric die 801 that includes at least one sensor.

Figure 9:
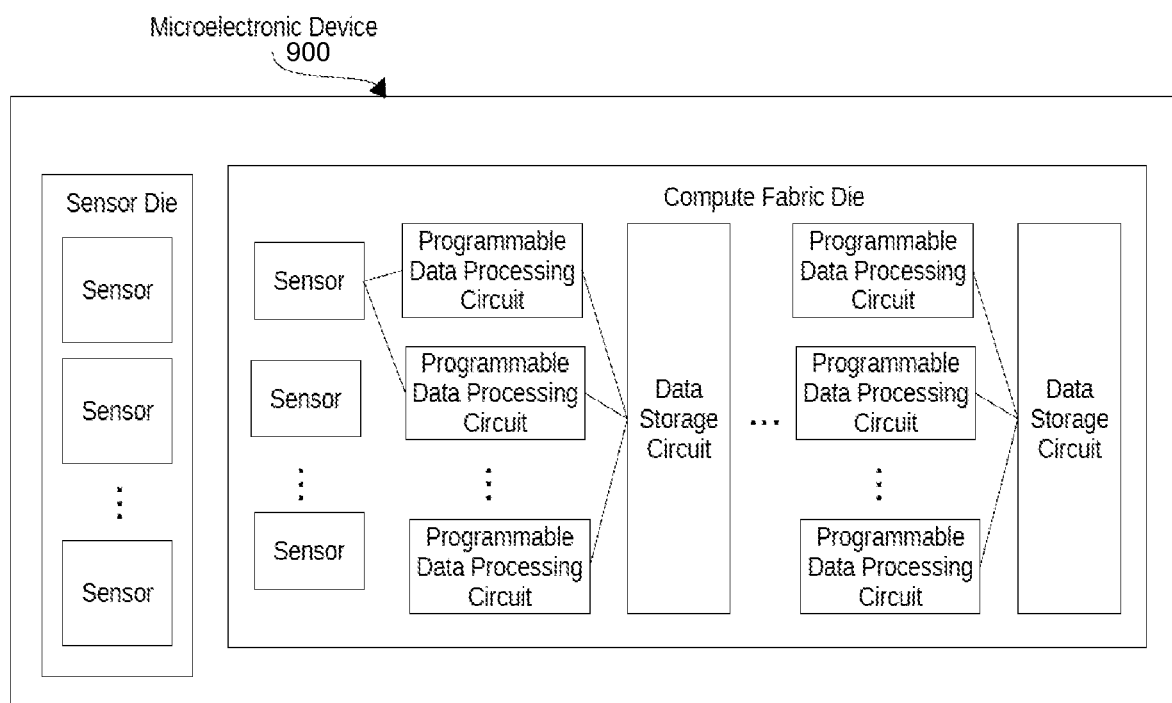

FIG. 9 is a schematic representation of a system 900 that includes a compute fabric die that includes at least one sensor, and a sensor die that includes a plurality of sensors.

Figure 10:
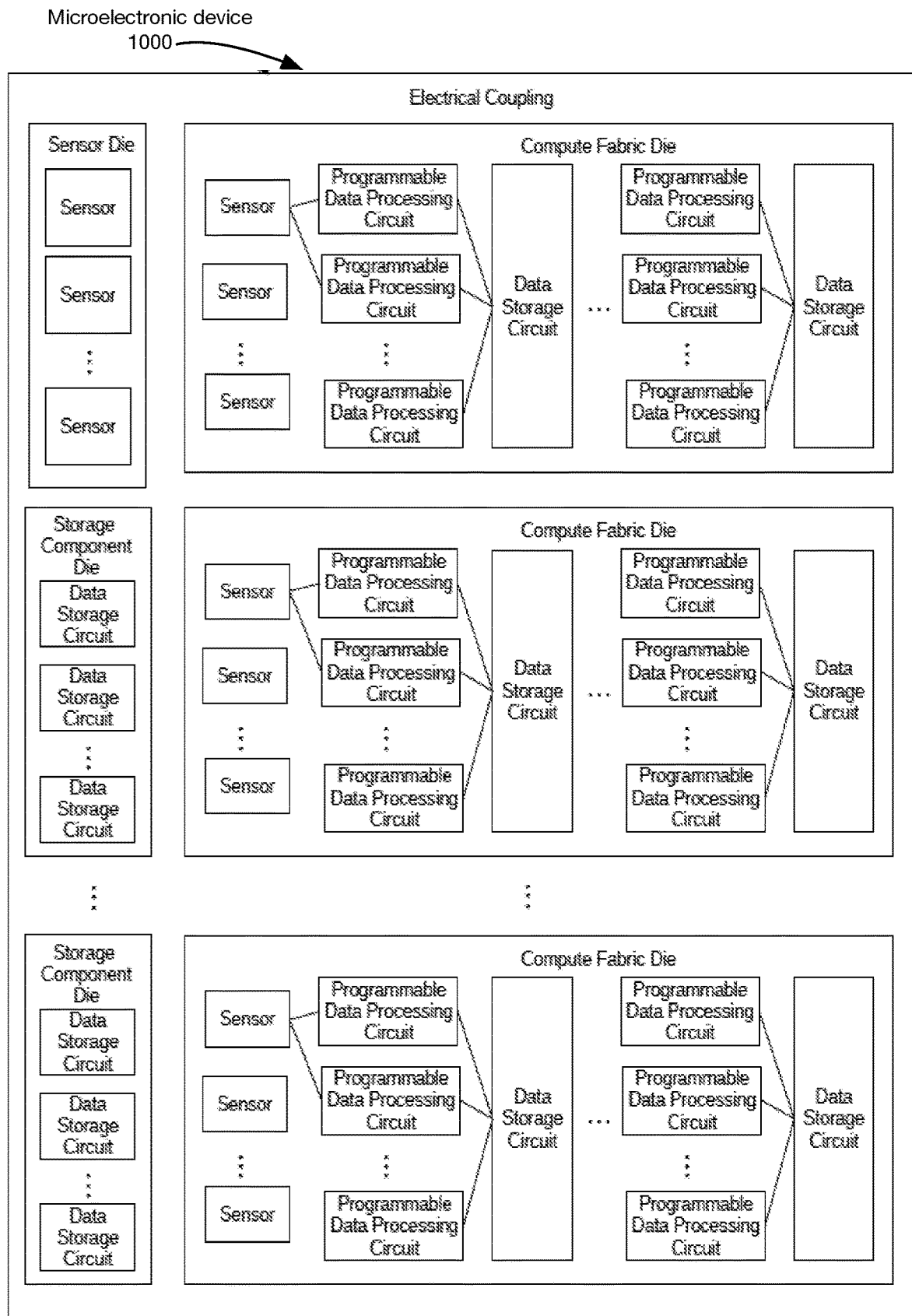

FIG. 10 is a schematic representation of a system 1000 that includes plural compute fabric dies that each include at least one sensor, a sensor die that includes a plurality of sensors, and plural storage component dies that each include a plurality of data storage circuits, coupled together via an electrical coupling.

Figure 11:
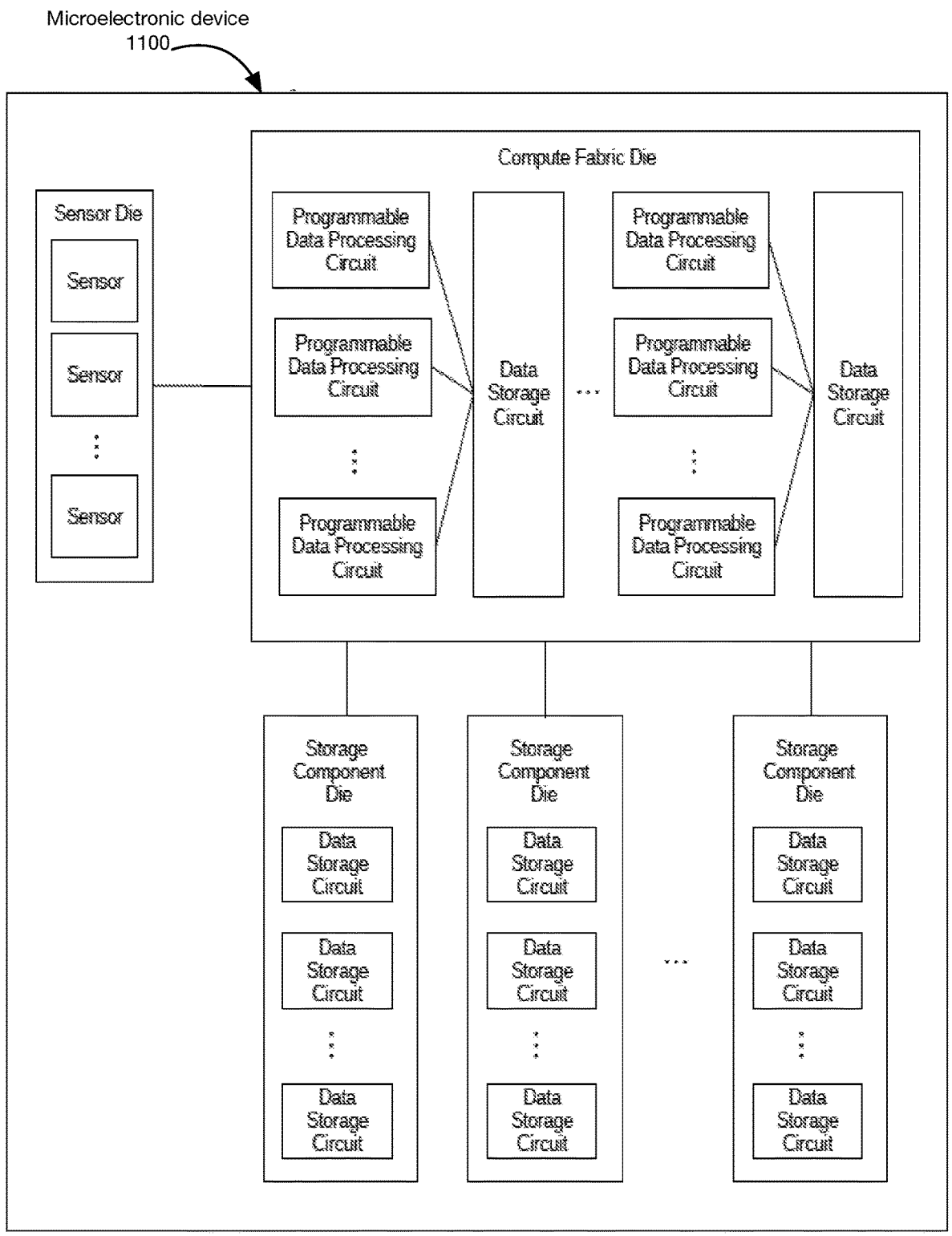

FIG. 11 is a schematic representation of a system 1100 that includes a compute fabric die coupled to a sensor die that includes a plurality of sensors, and coupled to plural storage component dies that each include a plurality of data storage circuits.

Figure 12:
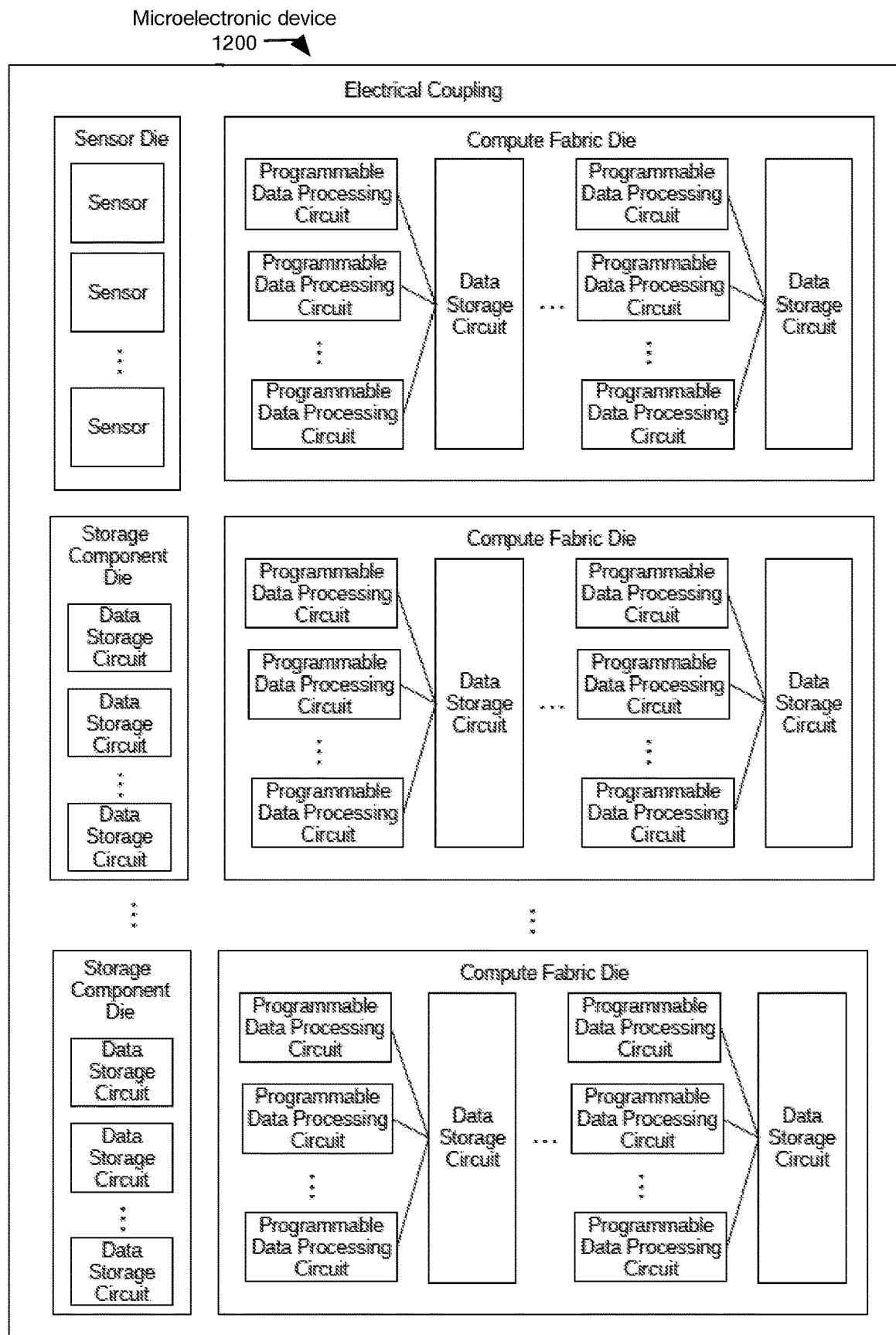

FIG. 12 is a schematic representation of a system 1200 that includes plural compute fabric dies, a sensor die that includes a plurality of sensors, and plural storage component dies that each include a plurality of data storage circuits, coupled together via an electrical coupling.

Figure 13:
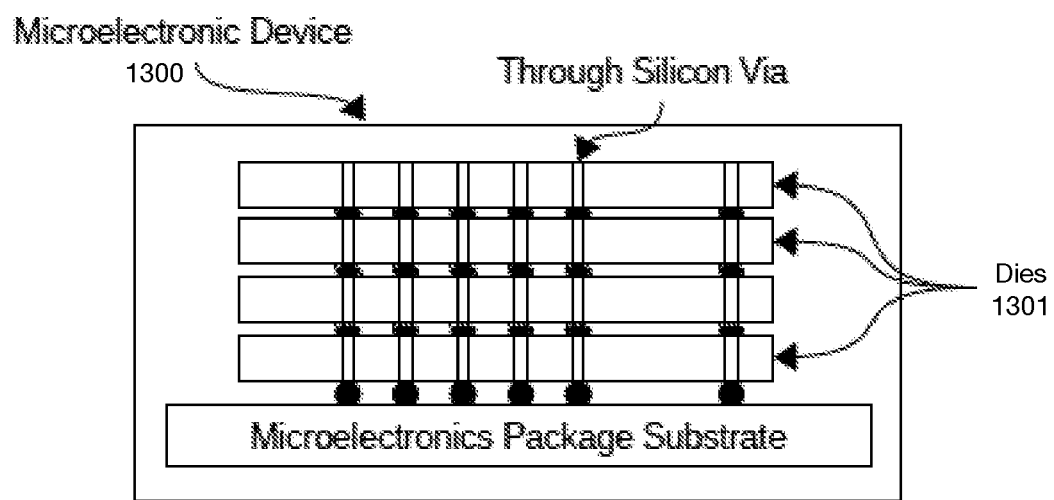

FIG. 13 is a schematic representation of a system 1300 in which dies 1301 are directly coupled via a through-silicon via (TSV) vertical electrical connection. In some embodiments, dies 1301 includes at least one of a compute fabric die, a storage die and a sensor die.

Figure 14:
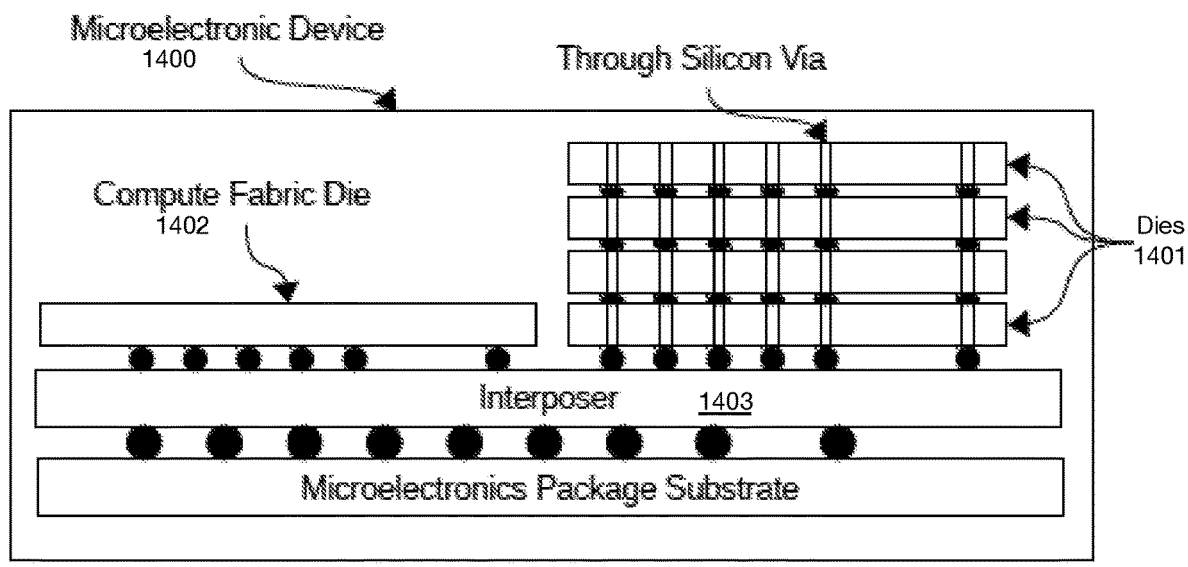

FIG. 14 is a schematic representation of a system 1400 having a stacked 2.5D configuration in which dies 1401 are directly coupled via a through-silicon via (TSV) vertical electrical connection and the dies 1401 are coupled to a compute fabric die 1402 via an interposer die 1403 that is stacked atop the adjacent die dies 1401 and 1402. In some embodiments, dies 1401 include at least one of a storage die and a sensor die.

Roles

In some embodiments, individual data processing components (programmable data processing circuit component) and data storage components are directly and individually programmed for different functions depending on the roles attributed to the component during program instruction execution. In some embodiments, each programmable data processing circuit component is electrically coupled to at least one data storage circuit component that includes machine-executable program instructions that are executable by the programmable data processing circuit component, and wherein each programmable data processing circuit component is programmed by storing program instructions at the storage circuit component electrically coupled to the data processing circuit component.

Typical roles may include but are not exclusively restricted to "data collection", "data integration", "analysis", "learning", "intrinsic properties", "profiling", "monitoring", "data fusion", and "data attestation".

In some embodiments, in a data collecting role, functions include commands for enabling and disabling the collection of data from sensor components. Data collecting role functions include commands for configuring sensor component operating properties such as sensor sensitivity, dynamic operating range, biasing conditions.

In some embodiments, in a data integration role, functions include algorithm specific calculations, data retrieval and data storage commands aimed at combining data captured from sensor components by processing and storage components in data collecting roles. Functions in the data collection role also include commands to configure the functionality of components in the data collection role.

In some embodiments, in an analysis role, processing and storage elements perform signal processing or error correction specific calculations along with associated data retrieval and data storage commands for preprocessing data in preparation of applying machine learning techniques. Examples of analysis include data sampling, time or spectral based filtering, recovery of corrupted sensor data. Functions in the analysis role also include commands to configure the functionality of components in the data integration role.

In some embodiments, processing and storage components in the learning role are programmed with functions for implementing calculations, data retrieval and storage as defined to the applicable algorithms. Functions include commands for interfacing with components in the analysis role in order to retrieve data from said components. Functions include commands to configure the functionality of components in the analysis role. Functions include calculation, data retrieval and data storage commands necessary for the implementation of well-known machine learning algorithms such as statistical classification, statistical spectral density estimation, clustering, principal component analysis, independent component analysis, singular value decomposition, learning classifiers, kernel estimators.

In some embodiments, in the "intrinsic properties" role, processing components execute commands designed to place discrete processing, storage and sensor components in a maintenance mode and where certain biasing and control parameters of the components in the maintenance mode are continuously changed in order to heuristically collect information pertinent to the unique intrinsic physical specificities of each discrete component being exercised. These specificities are related to semiconductor process variations that occur naturally during manufacturing.

In some embodiments, the intrinsic physical specificities of discrete sensor components are used to calibrate individual sensor components.

In some embodiments, individual intrinsic physical specificities are combined to calibrate groups of sensor components.

In some embodiments, the intrinsic physical specificities of components are applied to security and cryptography applications.

In a profiling role, functions include at least one of capturing and aggregation of statistical heuristic information pertinent to data in order to generate analytics (characteristic information summaries) for the purpose of characterizing data quality, detecting and learning data characteristic outliers/aberrations, classification of risk modalities, predicting failure probabilities, predicting failure modalities, and learning/identifying new modalities pertinent to data.

In a monitoring role, functions include comparing data characteristics against expected behavior profiles under defined operating/environmental paradigms.

In a data fusion role, functions include combining data from heterogeneous sources/sensors in order to create multimodal information by using application/data dependent statistical learning processes. Such information is produced by leveraging machine learning techniques to extract characteristic information from data/sensor sources that renders information properties of interest salient for the purpose of profiling, analysis, analytics extraction, attestation, and the like.

In a data attestation role, functions include at least one of tagging data and verifying existing embedded data tags in order to verify at least one of: authenticity (not tampered with), completeness (is any data missing), traceability (verifiable ledger of hops and/or path has data taken before getting here), authentication (source/transmitter validation and/or recipient validation), authorization (sender/recipient permission/credentials verification for data transfer), and accountability (deterministic traceability—is the traceability ledger correct/acceptable/match the expected path?).

Data Storage Circuit Components

In some embodiments, at least one data processing circuit component is coupled to a data storage circuit component that includes processing circuit instructions for performing linear algebra computation.

In some embodiments, at least one data processing circuit component is coupled to a data storage circuit component that includes processing circuit instructions for a statistical classification process.

In some embodiments, at least one data processing circuit component is coupled to a data storage circuit component that includes processing circuit instructions for a statistical spectral density estimation.

In some embodiments, at least one data processing circuit component is coupled to a data storage circuit component that includes processing circuit instructions for a clustering process.

In some embodiments, at least one data processing circuit component is coupled to a data storage circuit component that includes processing circuit instructions for a principal component analysis process.

In some embodiments, at least one data processing circuit component is coupled to a data storage circuit component that includes processing circuit instructions for an independent component analysis process.

In some embodiments, at least one data processing circuit component is coupled to a data storage circuit component that includes processing circuit instructions for a singular value decomposition process.

In some embodiments, at least one data processing circuit component is coupled to a data storage circuit component that includes processing circuit instructions for a learning classifier process.

In some embodiments, at least one data processing circuit component is coupled to a data storage circuit component that includes processing circuit instructions for a kernel estimator process.

In some embodiments, at least one data processing circuit component is coupled to a data storage circuit component that includes processing circuit instructions for arithmetic computations.

In some embodiments, at least one data processing circuit component is coupled to a data storage circuit component that includes processing circuit instructions for selecting a sensor of the microelectronic device as a data source, and generating analysis results from data received from the selected sensor.

In some embodiments, at least one data processing circuit component is coupled to a data storage circuit component that includes processing circuit instructions for selecting at least one of a sensor, a data storage circuit component, and a data processing circuit components as an intrinsic properties component, generating identifying information by changing biasing and control parameters of the selected intrinsic properties component, and generating the identifying information based on the results of the changing of the biasing and control parameters.

In some embodiments, at least one data processing circuit component is coupled to a data storage circuit component that includes processing circuit instructions for tagging analysis results generated for data provided by a sensor of the microelectronic device with tagging information generated from the identifying information.

In some embodiments, at least one data processing circuit component is coupled to a data storage circuit component that includes processing circuit instructions for calibrating at least one of the plurality of sensors by using the identifying information.

In some embodiments, at least one data processing circuit component is coupled to a data storage circuit component that includes processing circuit instructions for generating a secret cryptographic key by using the identifying information.

In some embodiments, at least one data processing circuit component is coupled to a data storage circuit component that includes processing circuit instructions for generating a cryptographic private/public key pair by using the identifying information.

In some embodiments, at least one data processing circuit component is coupled to a data storage circuit component that includes processing circuit instructions for using the identifying information to generate a secret cryptographic key, collecting a first sample of sensor data from a sensor of the microelectronic device, and generating a digital signature by signing the first sample of sensor data by using the secret cryptographic key.

In some embodiments, at least one data processing circuit component is coupled to a data storage circuit component that includes processing circuit instructions for providing the signature and the first sample of the sensor data to a blockchain system.

In some embodiments, at least one data processing circuit component is coupled to a data storage circuit component that includes processing circuit instructions for collecting a first sample of sensor data from a sensor of the microelectronic device, generating a hash of the first sample of sensor data, and providing the hash and the first sample of the sensor data to an external blockchain system.

In some embodiments, at least one data processing circuit component is coupled to a data storage circuit component that includes processing circuit instructions for accessing a public cryptographic key, collecting a first sample of sensor data from a sensor of the microelectronic device, encrypting the first sample of sensor data by using the public cryptographic key, and providing the encrypted first sample of the sensor data to a blockchain system.

In some embodiments, at least one data processing circuit component is coupled to a data storage circuit component that includes processing circuit instructions for using the identifying information to generate a secret cryptographic key, collecting a first sample of sensor data from a sensor of the microelectronic device, generating a first data structure that includes the first sample of sensor data, generating a digital signature by signing the first data structure by using the secret cryptographic key, and providing the signature and the first data structure to a blockchain system.

Data Collection Mechanisms and Properties of Hardware Device Embodiments for Capturing Information at the Edge (0200) Direct Coupling Through Integrated Sensors In some embodiments, one or more data collection sensors (e.g., 101 of FIG. 1, 201 of FIG. 2) are integrated into device computation fabric. The sensor or sensors within a device may be of different types, have different function capabilities, data range collection capabilities and operating ranges.

In some embodiments, at least one sensor of a system (e.g. 100 of FIG. 1, 200 of FIG. 2) is included in an integrated circuit semiconductor die that includes at least a portion of the compute fabric (e.g., 102 of FIG. 1, 202 of FIG. 2).

In some embodiments, sensor 101 and a runtime-adaptable compute fabric 102 are included in a same integrated circuit semiconductor die.

In some embodiments, sensors (e.g., 101, 201) include microelectronic circuitry constructed to measure absolute voltages, differential voltages, direct electric current and alternating electric current. In some embodiments, sensors (e.g., 101, 201) include at least one of sensors based on at low-voltage differential signaling (LVDS), and current threshold detectors.

In some embodiments, sensors (e.g., 101, 201) include microelectronic circuitry constructed to measure electromagnetic waves. In some embodiments, the types and spectral bands that the sensors are capable of sensing depend on the semiconductor properties with which said microelectronic circuitry is implemented. In some embodiments, sensors (e.g., 101, 201) include implementations using High-Electron-Mobility Transistors (HEMT) such as those fabricated in Aluminum Gallium Arsenide on Gallium Arsenide for millimeter-wave sensors integrated with processing fabric.

In some embodiments, sensors (e.g., 101, 201) include microelectronic circuitry constructed to measure magnetic waves. In some embodiments, sensing capabilities depend on the semiconductor properties and design specifications with which said microelectronic circuitry is implemented. In some embodiments, sensors (e.g., 101, 201) include implementations using Gallium Arsenide on Gallium Arsenide for micro-Hall Effect sensors integrated with processing fabric.

In some embodiments, sensors (e.g., 101, 201) include microelectronic circuitry constructed to measure temperature. The sensing capabilities depend on the semiconductor properties and design specifications with which said microelectronic circuitry is implemented. In some embodiments, sensors (e.g., 101, 201) include implementations using Gallium Arsenide on Gallium Arsenide for temperature sensors integrated with processing fabric.

In some embodiments, sensors (e.g., 101, 201) include sensors connected to a processing layer through indirect optical coupling through an optical interface layer that is heterogeneously integrated with the processing layer. In some embodiments, sensors (e.g., 101, 201) include implementations using High-Electron-Mobility Transistors—for instance III/V materials such as Indium Gallium Arsenide fabricated photovoltaic based sensors integrated with processing fabric.

(0300) Direct Coupling Through Integrated Interface Medium (Sensors Connected by Direct Coupling to HI Layer Based Interface)

In some embodiments, one or more data collection sensors (e.g., 101 of FIG. 1, 201 of FIG. 2) are fabricated in a separate semiconductor integrated circuit die (e.g., 201) from the one containing the device compute fabric (e.g., 202). In some embodiments, sensors in the die containing the sensor (e.g., 201) are directly coupled to compute fabric in the die containing the device compute fabric (e.g., 202) via an interface medium.

In some embodiments, at least one sensor in the first sensor die 201 and a first runtime-adaptable compute fabric in the die 202 are directly coupled via an interface medium.

In some embodiments, the interface medium is a through-silicon via (TSV) vertical electrical connection. In some embodiments, the coupled dies are stacked to form a 3D integrated circuit. In some embodiments, an interface medium involves a stacked 2.5D configuration were adjacent die are interconnected using TSVs and an interposer die is stacked atop the adjacent die. In some embodiments, a sensor or sensors within a sensor die may be of different types, have different function capabilities, data range collection capabilities and operating ranges.

In some embodiments, sensors (e.g., 101, 201) include microelectronic circuitry constructed to measure absolute voltages, differential voltages, direct electric current and alternating electric current. In some embodiments, sensors (e.g., 101, 201) include at least one of sensors based on low-voltage differential signaling (LVDS), and current threshold detectors.

In some embodiments, sensors (e.g., 101, 201) include microelectronic circuitry constructed to measure electromagnetic waves. The types and spectral bands that the sensors are capable of sensing depend on the semiconductor properties with which said microelectronic circuitry is implemented. In some embodiments, sensors (e.g., 101, 201) include implementations using High-Electron-Mobility Transistors (oHEMT) such as those fabricated in Aluminum Gallium Arsenide on Gallium Arsenide for millimeter-wave sensors.

In some embodiments, sensors (e.g., 101, 201) include microelectronic circuitry constructed to measure magnetic waves. The sensing capabilities depend on the semiconductor properties and design specifications with which said microelectronic circuitry is implemented. In some embodiments, sensors (e.g., 101, 201) include implementations using Gallium Arsenide on Gallium Arsenide for micro-Hall Effect sensors.

In some embodiments, sensors (e.g., 101, 201) include microelectronic circuitry constructed to measure temperature. The sensing capabilities depend on the semiconductor properties and design specifications with which said microelectronic circuitry is implemented. In some embodiments, sensors (e.g., 101, 201) include implementations using Gallium Arsenide on Gallium Arsenide for temperature sensors.

In some embodiments, sensors (e.g., 101, 201) include sensors connected to a processing layer through indirect optical coupling through an optical interface layer that is heterogeneously integrated with the processing layer. In some embodiments, sensors (e.g., 101, 201) include implementations using High-Electron-Mobility Transistors—for instance III/V materials such as Indium Gallium Arsenide fabricated photovoltaic based sensors.

(0400) Indirect Coupling Through Integrated Interface Medium (Sensors Connected Through Coupling to HI Layer Based Interface Through One or More Bridge Device)

Figure 3:
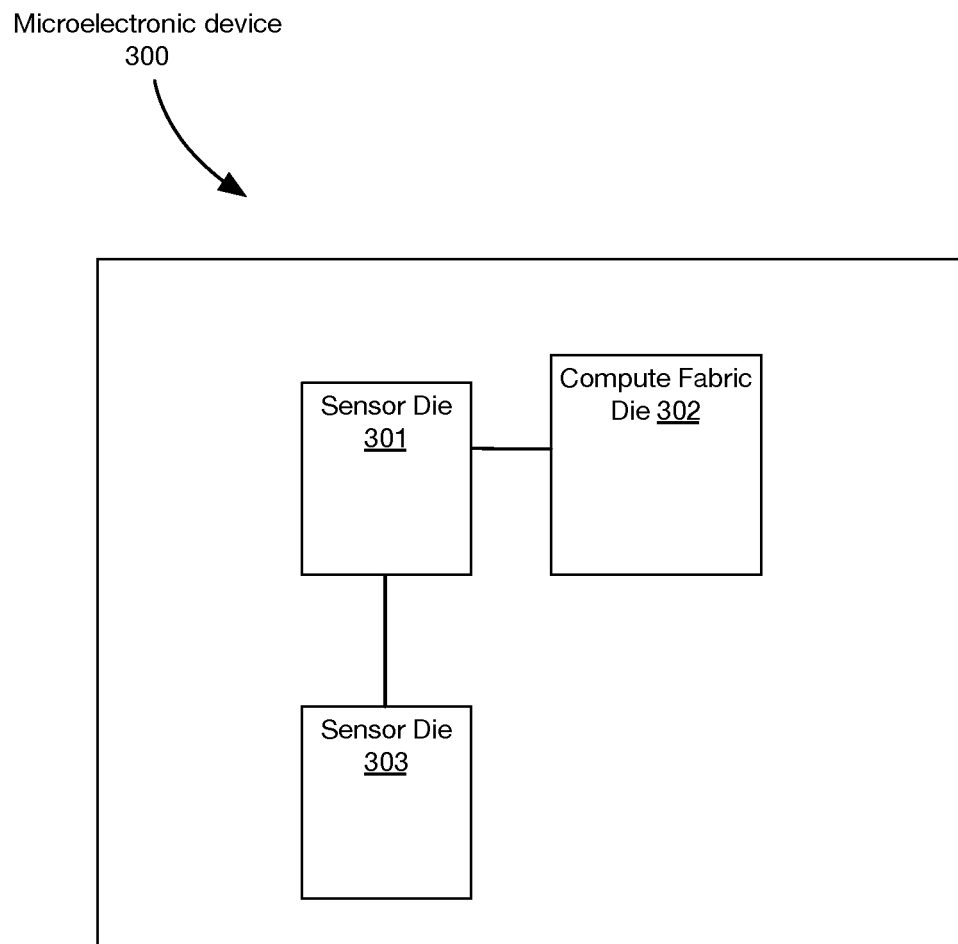
FIG. 3 is a schematic representation of a system, according to embodiments.

FIG. 3 is a schematic representation of a system 300 that is implemented as a microelectronic device that includes at least a first sensor die 301, a first runtime-adaptable compute fabric die 302, and a second sensor die 303. In some embodiments, the first sensor die 301 and the second sensor die are similar to the sensor die 201 of FIG. 2. In some embodiments, the compute fabric die 302 is similar to the compute fabric die 202 Of FIG. 2.

In some embodiments, sensors in the die 301 are directly coupled to compute fabric in the die 302 via a first interface medium and sensors in the die 303 are directly coupled to the first sensor die 301 via a second interface medium. In some embodiments, at least one of the first interface medium and the second interface medium is a through-silicon via (TSV) vertical electrical connection. In some embodiments, at least one pair of coupled dies are stacked to form a 3D integrated circuit. In some embodiments, at least one of the first interface medium and the second interface medium involves a stacked 2.5D configuration were adjacent die are interconnected using TSVs and an interposer die is stacked atop the adjacent die.

In some embodiments, the compute fabric in the die 302 is constructed to receive sensor data generated by a sensor in the sensor die 303 via the sensor die 301.

(0500) Indirect Coupling Through Non-Integrated Interface Medium (Sensors Connected to Processing Layer Through a Bridge Device External to Device)

Figure 4:
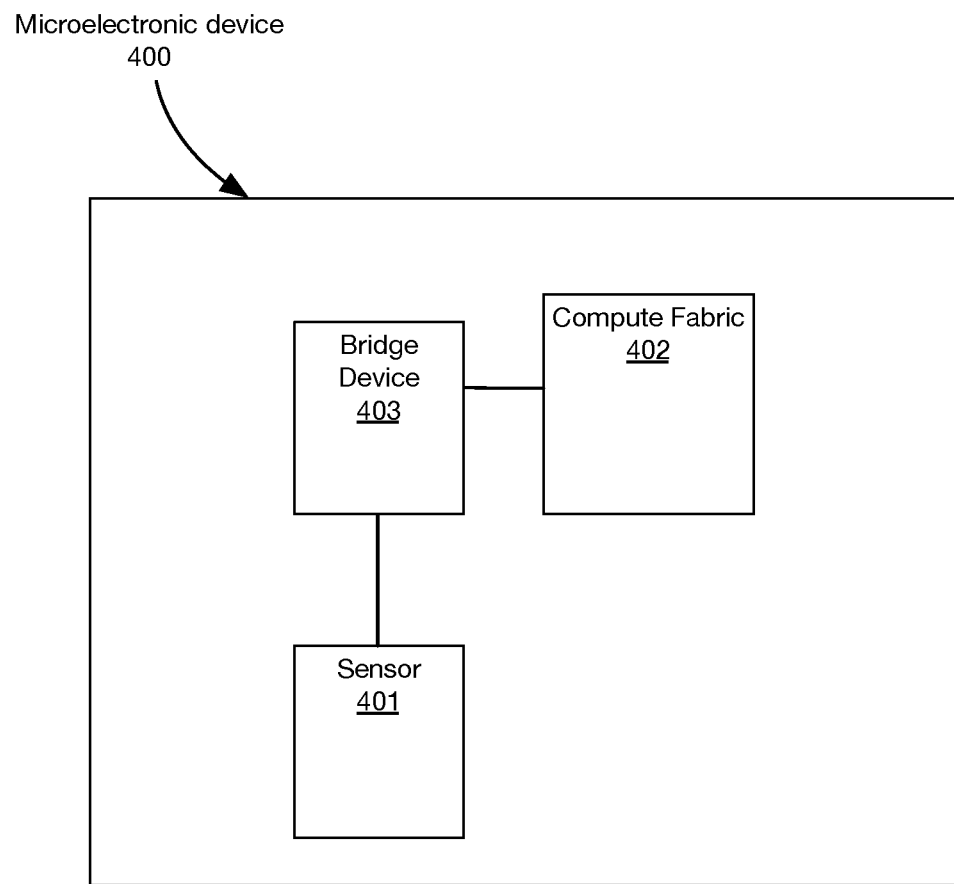
FIG. 4 is a schematic representation of a system, according to embodiments.

FIG. 4 is a schematic representation of a system 400 that is implemented as a microelectronic device that includes at least a first sensor 401, a first runtime-adaptable compute fabric 402, and a first bridge device 403. In some embodiments, the first sensor 401 is similar to the sensor 101 and the compute fabric 402 is similar to the compute fabric 102. In some embodiments, the first sensor 401 is coupled to the first bridge device 403, and the first bridge device 403 is coupled to the first runtime-adaptable compute fabric 402.

In some embodiments, the first runtime-adaptable compute fabric 402 is included in a first compute fabric die.

In some embodiments, the compute fabric die includes the first bridge device 403.

In some embodiments, the first bridge device 403 is included in a second die that is different from the first compute fabric die, and the compute fabric die is coupled to the second die via a first integrated interface medium.

In some embodiments, the first bridge device 403 is included in a second die that is different from the first compute fabric die, and the first sensor 401 is included in a third die that is different from the first compute fabric die and the second die. In some embodiments, the first sensor 401 is coupled to the first bridge device 403 via a first integrated interface medium, as described herein. In some embodiments, the first bridge device 403 is coupled to the compute fabric 402 via a second integrated interface medium, as described herein.

In some embodiments, at least one of the first interface medium and the second interface medium is a through-silicon via (TSV) vertical electrical connection. In some embodiments, at least one pair of coupled dies is stacked to form a 3D integrated circuit. In some embodiments, at least one of the first interface medium and the second interface medium involves a stacked 2.5D configuration were adjacent die are interconnected using TSVs and an interposer die is stacked atop the adjacent die.

In some embodiments, one or more data collection sensors (e.g., 401) are external to the first compute fabric die and connected to the compute fabric die through the first bridge device 403.

(0600) External Direct-Coupled Sensors

In some embodiments, sensor data processed by a first runtime-adaptable compute fabric die (e.g., 202 of FIG. 2) originates from a second runtime-adaptable compute fabric die (e.g., 203 of FIG. 3) coupled to the first runtime-adaptable compute fabric die by direct coupling through an electric interconnect. In some embodiments, sensor data processed by the first runtime-adaptable compute fabric die originates from a third runtime-adaptable compute fabric die coupled to the first runtime-adaptable compute fabric die by indirect coupling via an integrated interface medium, as described herein. In some embodiments, sensor data processed by the first runtime-adaptable compute fabric die originates from a fourth runtime-adaptable compute fabric die coupled to the first runtime-adaptable compute fabric die by indirect coupling via a bridge device, as described herein.

In some embodiments, at least two runtime-adaptable compute fabrics are included in a same integrated circuit semiconductor die. In some embodiments, the first runtime-adaptable compute fabric and the third runtime-adaptable compute fabric are included in different integrated circuit semiconductor dies, and coupled via an integrated interface medium. In some embodiments, the first runtime-adaptable compute fabric and the fourth runtime-adaptable compute fabric are included in different integrated circuit semiconductor dies, coupled via a bridge device.

In some embodiments, sensor data processed by the first runtime-adaptable compute fabric die originates from a combination of at least a second runtime-adaptable compute fabric die directly coupled to the first runtime-adaptable compute fabric and a third runtime-adaptable compute fabric die indirectly coupled to the first runtime-adaptable compute fabric.

(0700) External Indirect-Coupled Sensors

In some embodiments, sensors included in different external devices are indirectly coupled to the compute fabric device.

Sensor Data Transmitter in Fabric Die

In some embodiments, the sensor 101 and the first runtime-adaptable compute fabric 102 of FIG. 1 are included in an integrated circuit semiconductor die (first die), and the first die also includes at least a first transmitter coupled to the sensor 101. In some embodiments, the transmitter is constructed to transmit sensor data of the sensor 101 to a second sensor that is coupled to a second runtime-adaptable compute fabric. In some embodiments, the second runtime-adaptable compute fabric is included in a second die that is different from the first die. In some embodiments, the first transmitter is a millimeter-wave transmitter. In some embodiments, the first transmitter is a millimeter-wave transmitter that is coupled to the sensor 101, and the sensor 101 is fabricated using HEMT semiconductor materials. In some embodiments, the first transmitter is a millimeter-wave transmitter that is coupled to the second sensor, and the second sensor is fabricated using HEMT semiconductor materials.

Sensor Data Transmitter in Die Separate from Fabric Die

In some embodiments, the first runtime-adaptable compute fabric of the die 202 (of FIG. 2) is coupled to the sensor die 201 (via one of an integrated interface medium and a bridge device as described herein) and the sensor die 201 includes semiconductor materials of a first sensor and at least an integrated first transmitter. In some embodiments, the first transmitter of the die 201 is coupled to the sensor of the die 201. In some embodiments, the first transmitter of the die 201 is constructed to transmit sensor data of the sensor of the die 201 to a second sensor that is coupled to a second runtime-adaptable compute fabric. In some embodiments, the second runtime-adaptable compute fabric is included in a second die that is different from the first die 202. In some embodiments, the first transmitter is a millimeter-wave transmitter. In some embodiments, the first transmitter is a millimeter-wave transmitter that is coupled to the sensor of the die 201, and the sensor of the die 201 is fabricated using HEMT semiconductor materials. In some embodiments, the first transmitter is a millimeter-wave transmitter that is coupled to the second sensor, and the second sensor is fabricated using HEMT semiconductor materials.

In some embodiments, a first runtime-adaptable compute fabric is constructed to process sensor data received from a second runtime-adaptable compute fabric via at least one of a bridge device, an integrated interface medium, and a transmitter, as described herein.

(0800) Mixed Coupled Sensors

In some embodiments, a microelectronic device package includes a plurality of a compute fabric dies, each compute fabric die including at least one compute fabric; wherein at least one compute fabric is coupled to at least one sensor, as described herein; wherein at least a first compute fabric of the microelectronic device package is constructed to receive sensor data via a second compute fabric of the microelectronic device package. In some embodiments, the microelectronic device package includes a plurality of data collection sensors, each sensor being coupled to at least one compute fabric. In some embodiments, the plurality of data collection sensors include at least two sensors that are different in at least one of type, function capabilities, data range collection capabilities and operating ranges. In some embodiments, the plurality of data collection sensors are coupled across one or more devices within the microelectronic device package by any one of the circuit coupling arrangements described herein.

FIG. 7

Figure 7:
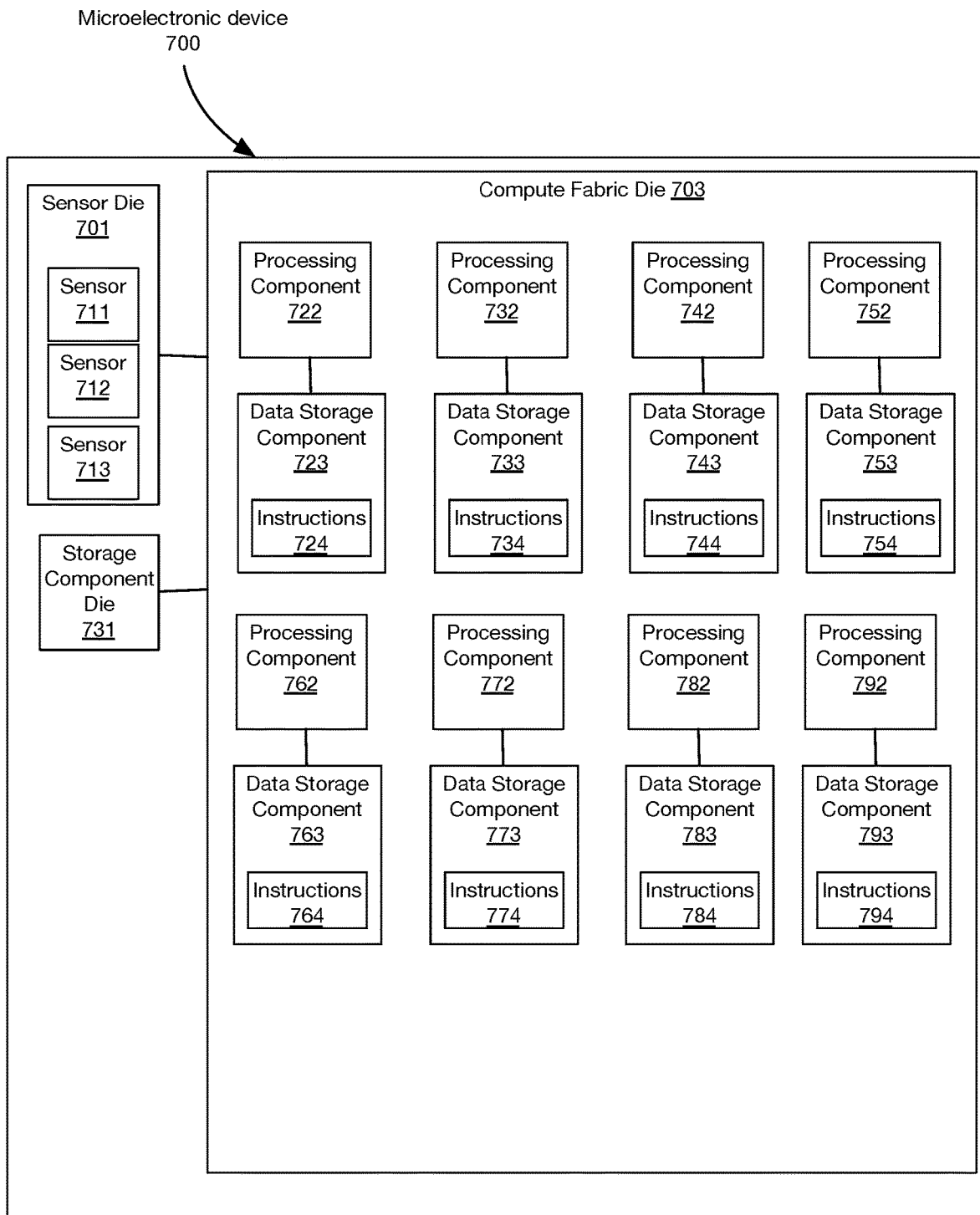
FIGS. 7-14 are schematic representations of systems, according to embodiments.

FIG. 7 is a schematic representation of a system 700, according to some embodiments. In some embodiments, the system 700 includes at least one sensor (e.g., 711, 712, 713) and a runtime-adaptable compute fabric. In some embodiments, the runtime-adaptable compute fabric and the sensor are included in a same microelectronic device.

In some embodiments, the runtime-adaptable compute fabric includes a plurality of compute fabric components, including at least one programmable data processing circuit component (e.g., 722, 732, 742, 752, 762, 772, 782, 792) and at least one data storage circuit component (e.g., 723, 733, 743, 753, 763, 773, 783, 793). In some embodiments, the compute fabric components are arranged on a single compute fabric die (e.g., 703). In some embodiments, the compute fabric components are arranged on a plurality of compute fabric dies. In some embodiments, a programmable data processing circuit component (e.g., 722) is coupled to a corresponding data storage circuit component (e.g., 723), and the data storage circuit component includes instructions (e.g., 724) that are executed by the data processing circuit component (e.g., 722). In some embodiments, a programmable data processing circuit component is re-programmed by updating the instructions (e.g., 724, 734, 744, 754, 764, 774, 784, 794) stored at the corresponding data storage circuit component (e.g., 723, 733, 743, 753, 763, 773, 783, 793).

In some embodiments, system 700 includes a plurality of sensors 711, 712, and 713. In some embodiments, the plurality of sensors and one or more compute fabric components of the runtime-adaptable compute fabric 102 are included in a same microelectronic device package.

In some embodiments, at least one sensor is integrated into the runtime-adaptable compute fabric, wherein the compute fabric includes the one or more compute fabric components.

In some embodiments, at least one sensor is fabricated in a first semiconductor integrated circuit die (e.g., 701), the one or more compute fabric components are fabricated in a second semiconductor integrated circuit die (e.g., 703), and at least one sensor of the first integrated circuit die is directly coupled to at least one compute fabric component of the second semiconductor integrated circuit die via an interface medium.

In some embodiments, at least one sensor is fabricated in a first semiconductor integrated circuit die, the one or more compute fabric components are fabricated in a second semiconductor integrated circuit die, at least one sensor of the first integrated circuit die is directly coupled to at least one compute fabric component of the second semiconductor integrated circuit die via an interface medium, and a sensor external to the microelectronic device is communicatively coupled (or electrically coupled) to a sensor of the first semiconductor integrated circuit die.

In some embodiments, a sensor is communicatively coupled (or electrically coupled) to at least one compute fabric component via a bridge interface medium that is external to the one or more compute fabric component, and the bridge medium is communicatively (or electrically) coupled to the one or more compute fabric component.

In some embodiments, the system 700 is similar to the system 100. In some embodiments, the system 700 is similar to the system 200. In some embodiments, the system 700 is similar to the system 300. In some embodiments, the system 700 is similar to the system 400.

In some embodiments, the instructions 724 include instructions for generating weighted spatially correlated adjustments for received sensor data.

In some embodiments, the instructions 724 include instructions for a dynamic Spline-Laplacian kernel.

In some embodiments, the instructions 724 include instructions for cross-correlating weighted spatially correlated adjustments for received sensor data with at least one of: 1) patient characteristic data stored by the microelectronic device; and 2) parameters of an electroencephalography device.

In some embodiments, the instructions 734 include instructions for a training model. In some embodiments, the training model is a training model for cortical and thalamic activity.

In some embodiments, the instructions 744 include instructions for an active Approximate Entropy (ApEn) learning kernel.

In some embodiments, the instructions 754 include instructions for performing a weighted Principal Component Analysis process.

In some embodiments, the instructions 764 include instructions for a K-means clustering vector quantization kernel.

In some embodiments, the instructions 774 include instructions for a statistical classification kernel.

In some embodiments, at least one of the instructions 724, 734, 744, 754, 764, 774, 784, 794 include instructions for hashing a public key of a key pair used for encryption.

In some embodiments, at least one of the instructions 724, 734, 744, 754, 764, 774, 784, 794 include instructions for decrypting data (e.g., sensor data, data structures, hashes, and the like).

In some embodiments, the instructions 724, 734, 744, 754, 764, 774, 784, 794 and corresponding processing components 722, 732, 742, 752, 762, 772, 782, 792 of FIG. 7 are distributed across a plurality of compute fabric dies. In some embodiments, each of the processing components 722, 732, 742, 752, 762, 772, 782, 792 of FIG. 7 has a same instruction set and architecture. In some embodiments, each of the processing components 722, 732, 742, 752, 762, 772, 782, 792 can be reprogrammed by updating by reprogramming the corresponding instructions. In this manner, process steps of a method, such as the method described herein with respect to FIG. 6, can be assigned to specific processing components within a microelectronic device, and re-assigned to different processing components during run-time by updating the instructions 724, 734, 744, 754, 764, 774, 784, 794 during run-time.

3. Methods

FIG. 5

Figure 5:
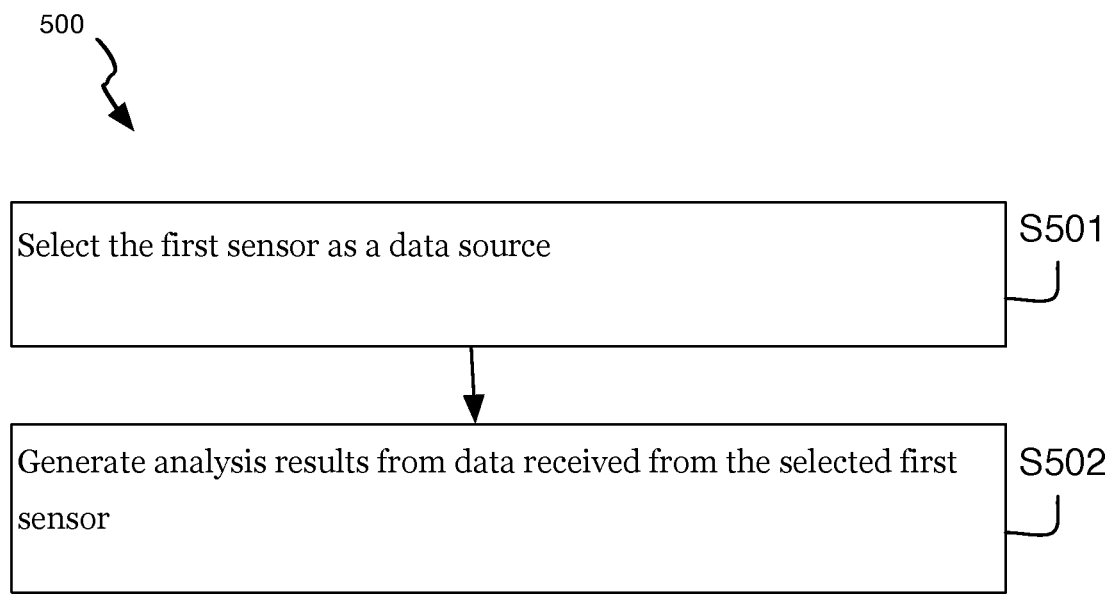
FIG. 5 is a representations of a method, according to embodiments.

FIG. 5 is a representation of a method 500, according to embodiments.

In some embodiments, the method 500 is performed by the system 100 of FIG. 1. In some embodiments, the method 500 is performed by the system 200 of FIG. 2. In some embodiments, the method 500 is performed by the system 300 of FIG. 3. In some embodiments, the method 500 is performed by the system 400 of FIG. 4. In some embodiments, the method 500 is performed by any one of the systems 700-1400 of FIGS. 7-14, respectively.

In some embodiments, the method 500 is performed by a microelectronic device that includes: a first sensor die (e.g., 201 of FIG. 2) that includes a plurality of sensors including a first sensor (e.g., 211); a plurality of runtime-adaptable compute fabric dies (e.g., 202 of FIG. 2) that each comprise a plurality of programmable data processing circuit components (e.g., 222) and data storage circuit components (e.g., 223), wherein within each compute fabric die (e.g., 202) at least one of the programmable data processing circuit components (e.g., 222) is electrically coupled to at least one of the plurality of data storage circuit components (e.g., 223); and a plurality of storage component dies (e.g., 231), wherein each storage component die (e.g., 231) is electrically coupled to at least one of the plurality of compute fabric dies (e.g., 202), wherein the first sensor die (e.g., 201) and each compute fabric die (e.g., 202) and storage component die (e.g., 231) is an integrated circuit semiconductor die, wherein the plurality of compute fabric dies (e.g., 202) includes at least a first compute fabric die (e.g., 202) and a second compute fabric die (e.g., 203) electrically coupled to the first compute fabric die, wherein at least one of a data processing component (e.g., 222) and a storage component (e.g., 223) of the microelectronic device is electrically coupled to the first sensor (e.g., 211), wherein each compute fabric die (e.g., 202, 203) has a same system architecture, wherein at least one data processing circuit component (e.g., 222) is coupled to a data storage circuit component (e.g., 223) that includes processing circuit instructions (e.g., 224) for selecting at least one sensor (e.g., 211) as a data source, and wherein at least one data processing circuit component (e.g., 222, 232, 242, 252) is coupled to a data storage circuit component (e.g., 223, 233, 243, 253) that includes processing circuit instructions (e.g., 224, 234, 244, 254) for generating analysis results from data received from the selected sensor.

As shown in FIG. 5A, the method 500 includes: selecting the first sensor as a data source (process S501); and generating analysis results from data received from the selected first sensor (process S502).

In some embodiments, at least one of the first data processing component and the second data processing component perform the processes S501 to S502. In some embodiments, each of the processes S501 to S502 are performed by different data processing components of the microelectronic device. In some embodiments, instructions for processes S501 to S502 are distributed across processing components of the microelectronic device. In some embodiments, instructions for processes S501 to S502 are distributed across processing components of the microelectronic device, and the distribution of processes across the processing components is updated by the updating program instructions for the processing components stored by respective storage components (e.g., 223).

FIG. 6

Figure 6A:
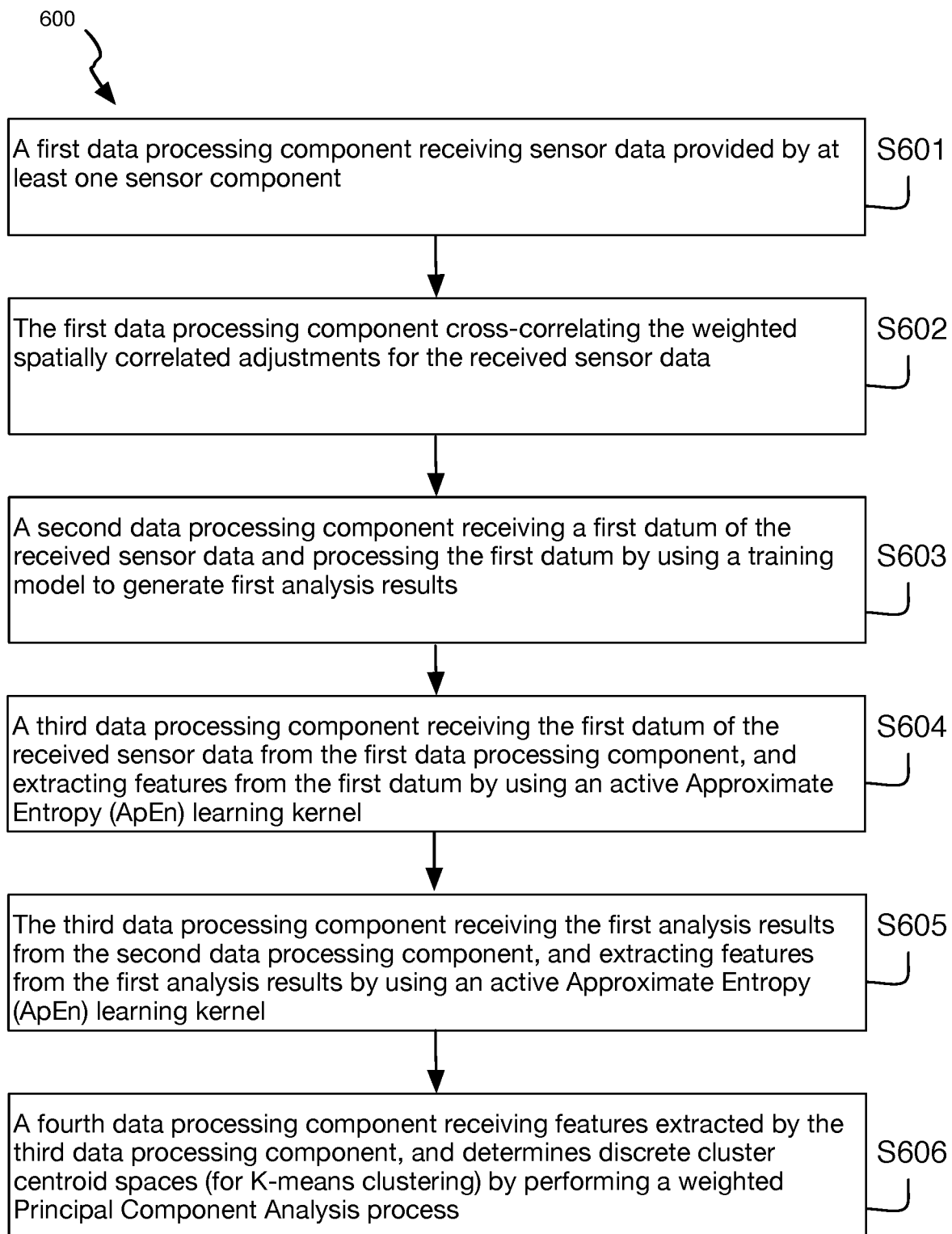
FIGS. 6A-B is a representations of a method, according to embodiments.

FIG. 6A is a representation of a method 600, according to embodiments.

In some embodiments, the method 600 is performed by the system 100 of FIG. 1. In some embodiments, the method 600 is performed by the system 200 of FIG. 2. In some embodiments, the method 600 is performed by the system 300 of FIG. 3. In some embodiments, the method 600 is performed by the system 400 of FIG. 4. In some embodiments, the method 600 is performed by a microelectronic device similar to the microelectronic device described with respect to the method of FIG. 5.

In some embodiments, the method 600 is performed by any one of the systems 700-1400 of FIGS. 7-14, respectively.

Figure 6B:
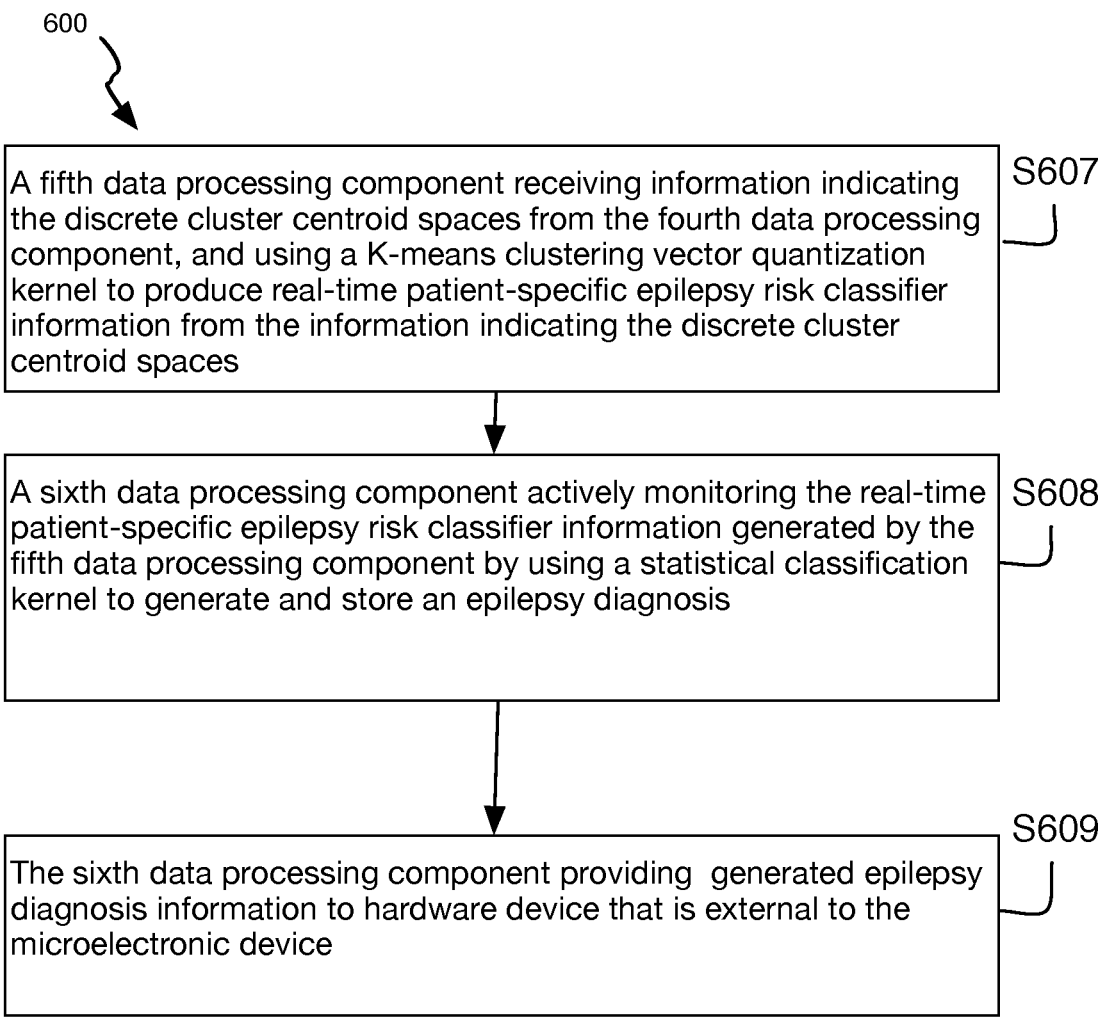

As shown in FIG. 6, the method 600 includes: a first data processing component (Component L) (e.g., 722 of FIG. 7) of the microelectronic device receiving sensor data provided by at least one sensor component (e.g., 711) of the microelectronic device (process S601). In some embodiments, the sensor data is provided by a first sensor (e.g., 711) of the microelectronic device. In some embodiments, the first sensor is coupled to EEG probes, and the sensor data is measured electrode potential differentials reported by the first sensor. In some embodiments, the first data processing component (e.g., 722) produces weighted spatially correlated adjustments for the received sensor data. In some embodiments, the first data processing component (e.g., 722) uses a dynamic Spline-Laplacian kernel to continuously produce weighted spatially correlated adjustments for the received sensor data.

In some embodiments, the method 600 includes: the first data processing component (e.g., 722 of FIG. 7) cross-correlating the weighted spatially correlated adjustments for the received sensor data with at least one of: 1) patient characteristic data stored by the microelectronic device; and 2) parameters of an electroencephalography device (process S602).

In some embodiments, the method 600 includes: the first data processing component (e.g., 722 of FIG. 7) using the results of the cross-correlation as a biasing condition for the at least one sensor component (e.g., 711).

In some embodiments, the method 600 includes: a second data processing component (Component T) (e.g., 732 of FIG. 7) of the microelectronic device receiving a first datum of the received sensor data and processing the first datum by using a training model to generate first analysis results (process S603). In some embodiments, the training model is a training model for cortical and thalamic activity. In some embodiments, the first datum includes sensor data adjusted by weighted spatially correlated adjustments generated by the first data processing component (e.g., 722). In some embodiments, the second data processing component (e.g., 732) receives the first datum from the first data processing component (e.g., 722).

In some embodiments, the method 600 includes: a third data processing component (Component E) (e.g., 742 of FIG. 7) of the microelectronic device receiving the first datum of the received sensor data from the first data processing component, and extracting features from the first datum by using an active Approximate Entropy (ApEn) learning kernel (process S604).

In some embodiments, the method 600 includes: the third data processing component (Component E) (e.g., 742 of FIG. 7) receiving the first analysis results from the second data processing component, and extracting features from the first analysis results by using an active Approximate Entropy (ApEn) learning kernel (process S605).

In some embodiments, the method 600 includes: a fourth data processing component (Component P) (e.g., 752 of FIG. 7) of the microelectronic device receiving features extracted by the third data processing component, and detersmining discrete cluster centroid spaces (for K-means clustering) by performing a weighted Principal Component Analysis process (process S606).

In some embodiments, the method 600 includes: a fifth data processing component (Component K) (e.g., 762 of FIG. 7) of the microelectronic device receiving information indicating the discrete cluster centroid spaces from the fourth data processing component, and using a K-means clustering vector quantization kernel to produce real-time patient-specific epilepsy risk classifier information from the information indicating the discrete cluster centroid spaces (process S607).

In some embodiments, the method 600 includes: a sixth data processing component (Component M) (e.g., 772 of FIG. 7) of the microelectronic device actively monitoring the real-time patient-specific epilepsy risk classifier information generated by the fifth data processing component by using a statistical classification kernel to generate and store an epilepsy diagnosis (process S608).

In some embodiments, the method 600 includes: the sixth data processing component (Component M) (e.g., 772 of FIG. 7) of the microelectronic device providing generated epilepsy diagnosis information to hardware device that is external to the microelectronic device (process S609).

4. Machines

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

5. Conclusion

As a person skilled in the art will recognize from the previous detailed description and from the figures and claims, modifications and changes can be made to the embodiments disclosed herein without departing from the scope defined in the claims.

What is claimed is:

1. A method comprising:
  receiving a first datum at a first sensor die, the first sensor die includes at least a first sensor that is constructed to generate one of:
  magnetic wave measurement data and electromagnetic measurement data;
  providing the first datum to a first compute fabric die, the first compute fabric die comprising:
    a first compute fabric component that is electrically coupled to the first sensor;
    a first set of processing circuit instructions for generating analysis results from data received from the first sensor;
    a first programmable data processing circuit component; and
    a first data storage circuit component,
  processing the first datum by using the first compute fabric component; and
  generating analysis results from the first datum received at the first sensor die;
  wherein the steps of receiving at the first sensor die, processing by using the compute fabric die, and generating the analysis results, are all executed within a single microelectronic device package.

2. The method of claim 1, further comprising:
securing the single microelectronic device by using an electronic data key and/or an encryption such that the analysis results are available only with authorized access to the single microelectronic device package.

3. The method of claim 1, further comprising: at run-time, adapting the first compute fabric based upon the first datum and based upon the first sensor die.

4. The method off claim 1, further comprising receiving the datum from a medical biometric probe, the datum comprising measured electrode potential differentials.

5. The method of claim 1, further comprising providing the analysis results in real-time at the location of the microelectronic device.

6. The method of claim 1, further comprising: storing and using the analysis result locally in proximity to the microelectronic device without the need to transmit either the first datum or the analysis result over a distance.

7. The method of claim 1, further comprising:
producing by using the first data processing circuit component weighted spatially correlated adjustments for the first datum.

8. The method of claim 1, further comprising:
using a dynamic Spline-Laplacian kernel to continuously produce weighted spatially correlated adjustments for the first datum.

9. The method of claim 1, further comprising:
using results of cross-correlation as a biasing condition for a sensor component.

10. The method of claim 1, further comprising:
receiving the first datum at a second sensor, the second sensor different than the first sensor, such that the microelectronic device package is capable of performing a variety of processing types upon the same data.

11. The method of claim 1, further comprising:
receiving the first datum at a second sensor, the second sensor located within the microelectronic device package at a location separate from the first sensor such that the processing of the first datum is reliably performed regardless of the state of the first sensor.

12. The method of claim 1, further comprising:
receiving at a second data processing component, the first datum from the first data processing component,
processing the first datum by using a training model to generate first analysis results, wherein the training model is a training model for cortical and thalamic activity;
receiving at a third data processing component, the first datum,
extracting features from the first datum by using an active Approximate Entropy (ApEn) learning kernel.

13. The method of claim 12, further comprising:
receiving at a fourth data processing component, features extracted by the third data processing component,
determining discrete cluster centroid spaces (for K-means clustering) by performing a weighted Principal Component Analysis process;
receiving at a fifth data processing component, information indicating discrete cluster centroid spaces,
using a K-means clustering vector quantization kernel to produce real-time patient-specific epilepsy risk classifier information from the information indicating the discrete cluster centroid spaces;
receiving at a sixth data processing component, the real-time patient-specific epilepsy risk classifier information generated by the fifth data processing component,
actively monitoring by using a statistical classification kernel to generate and store an epilepsy diagnosis
providing generated epilepsy diagnosis information to a device that is external to the microelectronic device.

14. A method comprising:
sensing by using a first sensor of a first sensor die, a first input;
generating by using the first sensor at least one of electromagnetic measurement data and magnetic wave measurement data;
providing the output of the first sensor to a first compute fabric, the first compute fabric comprising:
a first data processing component that is programmable,
a first data storage component comprising a first set of processing instructions;
retrieving processing instructions from the first data storage;
adapting the first compute fabric during runtime;
processing the output of the first sensor by using the first set of processing instructions for the first data processing component;
generating analysis results from data received from the first sensor,
wherein the first sensor die, the first compute fabric, the first data processing component and the first data storage component are all coupled within a single microelectronic device package,
wherein the steps of sensing the first input, adapting the first compute fabric during runtime, processing the output of the first sensor, and generating analysis results all occur within the microelectronic device package.

15. The method of claim 14, further comprising:
sensing a magnetic wave and
generating magnetic measurement data, wherein the output of the first sensor is the magnetic measurement data.

16. The method of claim 14, further comprising:
sensing an electromagnetic wave and
generating electromagnetic measurement data, and wherein the output of the first sensor is electromagnetic measurement data.

17. The method of claim 14, further comprising: adapting the first compute fabric during runtime by programming a data processing circuit of the compute fabric to perform one of:
a machine learning process;
a statistical analysis process;
statistical spectral density estimation;
a clustering process;
a principal component analysis process;
an independent component analysis process;
a singular value decomposition process;
a learning classifier process;
a kernel estimator process;
a Physically Unclonable Function (PUF);
linear algebra computation, and
an arithmetic function.

18. The method of claim 14, further comprising:
updating the first set of programming instructions for adapting the first compute fabric,
wherein at least one storage component includes a high bandwidth memory (HBM).

19. The method of claim 14, further comprising:
selecting the first sensor as a data source from among a plurality of sensors within the first sensor die; and
selecting for the step of sensing, a second sensor that is different from the first sensor.

20. The method of claim 14, further comprising:
a plurality of compute fabrics that each comprise a plurality of programmable data processing circuit components and a plurality of data storage circuit components,
wherein within each compute fabric die at least one of the programmable data processing circuit components is electrically coupled to at least one of the plurality of data storage circuit components;
wherein each storage component die is electrically coupled to at least one of the plurality of compute fabric dies,
wherein the first sensor die and each compute fabric die and storage component die is an integrated circuit semiconductor die,
wherein the plurality of compute fabric dies includes at least a first compute fabric die and a second compute fabric die electrically coupled to the first compute fabric die,
wherein at least one of a data processing component and a storage component of the microelectronic device is electrically coupled to the first sensor,
wherein each compute fabric die has a same system architecture, and wherein at least a first compute fabric die is electrically coupled to a second compute fabric die in a die stacking arrangement,
wherein at least a first compute fabric die is electrically interconnected to a second compute fabric die via at least one TSV (Through-Silicon Via), and an interposer die is stacked atop the first compute fabric die and the second compute fabric die,
wherein at least a first compute fabric dies is electrically coupled to a first storage component die in a die stacking arrangement,
wherein at least a first compute fabric die is electrically interconnected to a first storage component die via at least one TSV (Through-Silicon Via), and an interposer die is stacked atop the first compute fabric die and the first storage component die,
wherein at least a first storage component die is electrically coupled to a second storage component die in a die stacking arrangement,
wherein at least a first storage component die is electrically interconnected to a second storage component die via at least one TSV (Through-Silicon Via), and an interposer die is stacked atop the first storage component die and the second storage component die,
wherein each programmable data processing circuit component is electrically coupled to at least one data storage circuit component that includes machine-executable program instructions that are executable by the programmable data processing circuit component, and wherein each programmable data processing circuit component is programmed by storing program instructions at the storage circuit component electrically coupled to the data processing circuit component,
wherein the first sensor die is an integrated circuit semiconductor die, and
wherein the first sensor die is electrically coupled to at least one of a data processing component and a storage component of the microelectronic device via one of an integrated interface medium and a die stacking arrangement,
wherein the integrated interface medium includes through-silicon via (TSV) vertical electrical connections,
wherein each programmable data processing circuit component has a same system architecture.

* * * * *